US008700317B1

(12) United States Patent
Wilder et al.

(10) Patent No.: US 8,700,317 B1
(45) Date of Patent: Apr. 15, 2014

(54) AERONAUTICAL HOLDING PATTERN CALCULATION FOR SOLVING HIGH WIND AND PROTECTED AIRSPACE ISSUES

(71) Applicants: Bruce Gary Wilder, Frisco, TX (US); Otto Charles Wilke, Waco, TX (US)

(72) Inventors: Bruce Gary Wilder, Frisco, TX (US); Otto Charles Wilke, Waco, TX (US)

(73) Assignee: Epoch Flight Systems LLC, Frisco, TX (US)

( * ) Notice: Subject to any disclaimer, the term of this patent is extended or adjusted under 35 U.S.C. 154(b) by 0 days.

(21) Appl. No.: 13/794,723

(22) Filed: Mar. 11, 2013

(51) Int. Cl.
*B64D 1/00* (2006.01)

(52) U.S. Cl.
USPC ............... 701/423; 701/3; 701/120; 701/122; 701/425; 701/487; 701/10

(58) Field of Classification Search
None
See application file for complete search history.

(56) References Cited

U.S. PATENT DOCUMENTS 3,110,965 A 11/1963 Kittock
4,182,171 A 1/1980 Looker
4,274,204 A 6/1981 Self
D377,942 S 2/1997 McCloy
6,167,627 B1 1/2001 Wilder et al.
6,678,587 B2 * 1/2004 Miller .............................. 701/3
6,847,866 B2 1/2005 Gaier
7,003,383 B2 2/2006 Rumbo et al.
7,152,332 B1 12/2006 Jain et al.
7,370,790 B2 5/2008 Martincik
7,630,829 B2 * 12/2009 Pepitone ....................... 701/120
7,903,000 B2 3/2011 Hammack et al.
8,234,058 B1 * 7/2012 Barber et al. ................. 701/120
8,244,453 B2 * 8/2012 Lacombe et al. ............. 701/122
2009/0319100 A1 12/2009 Kale et al.
2012/0130626 A1 * 5/2012 Klooster et al. .............. 701/120

FOREIGN PATENT DOCUMENTS

JP 7-104853 4/1995

OTHER PUBLICATIONS

U.S. Department of Transportation Federal Aviation Administration, Aeronautical Information Manual, Mar. 7, 2013, pp. 3, 338-344, and 617-733.*
U.S. Department of Transportation Federal Aviation Administration, FAA-H-8261-1A: Instrument Procedures Handbook, 2007, pp. 1-4, 100-102, 123-124, and 274-287.*
U.S. Department of Transportation Federal Aviation Administration, FAA-H-8083-15B: Instrument Flying Handbook, 2012, pp. 1-4, 301-304, and 346-365.*
U.S. Department of Transportation Federal Aviation Administration Order 7130.3A: Holding Pattern Criteria, Mar. 18, 1998, pp. 1-61.*

* cited by examiner

*Primary Examiner* — Helal A Algahaim
*Assistant Examiner* — Rebecca Wagner
(74) *Attorney, Agent, or Firm* — Swift & Swift; Stephen Christopher Swift

(57) ABSTRACT

A method of calculating Federal Aviation Administration (FAA) published or FAA Air Traffic Control assigned aeronautical holding patterns, comprising the steps of: defining navigational way points using their latitude and longitude coordinates; displaying the latitude and longitude that define the point for an inbound turn; defining four posts of a holding pattern; and showing the actual holding space dimensions along with the non-protected airspace. The method may be performed by a stand-alone electronic device or an electronic device having other functions. The latitude and longitude that define the point for an inbound turn can be displayed as a bearing, and/or as a distance along a radial. The inbound turning point can be calculated using a global positioning or flight management system. A turn may be commanded using an automatic flight control system or flight director. The holding pattern can be drawn to the correct shape with regards wind direction and velocity, or used as an overlay over a representation of terrain.

20 Claims, 23 Drawing Sheets

FIG. 2
26
WARNING
FLYING TOO
FAST!
28
24

FIG. 3
26
WARNING
WIND SPEED
IS TOO
GREAT!
30
24

AERONAUTICAL HOLDING PATTERN CALCULATION FOR SOLVING HIGH WIND AND PROTECTED AIRSPACE ISSUES

BACKGROUND OF THE INVENTION

1. Field of the Invention

The present invention relates to improved methods and systems for calculating Federal Aviation Administration (FAA) published or FAA Air Traffic Control assigned aeronautical holding patterns, using electronic devices.

2. Description of the Prior Art

There have been numerous prior inventions for determining holding patterns for aircraft, but none that are equivalent to the present invention.

U.S. Pat. No. 3,110,965, issued on Nov. 19, 1963, to James A. Kittock, discloses a device to aid pilots in entering and maintaining a holding pattern from a preset holding fix. It is not a method using an electronic device, but is an entry calculator (for tear drop, parallel and direct entries), and has no wind corrections, as is the instant invention.

U.S. Pat. No. 4,182,171, issued on Jan. 8, 1980, to Ivan L. Looker, discloses an aircraft navigation device that aids a pilot in flying holding patterns. Although it includes VOR radio receivers, it is not a method using an electronic device, does not calculate a heading, and does not calculate wind corrections, as in the instant invention.

U.S. Pat. No. 4,274,204, issued on Jun. 23, 1981, to Freddy R. Self, discloses an aircraft pattern computer, that is a mechanical device, rather than a method using an electronic device, and is primarily a traffic pattern calculator, not a holding pattern calculator, and does not calculate outbound heading or wind corrections, as does the instant invention.

U.S. Pat. No. 6,167,627, issued on Jan. 2, 2001, to Bruce Gary Wilder and Otto Charles Wilke, discloses an aeronautical holding pattern calculator, having both mechanical and electronic embodiments. It does not disclose the improvements that are the subject of the instant invention, including the use of the differential equations given below.

U.S. Pat. No. 6,678,587, issued on Jan. 13, 2004, to Ronald J. Miller, discloses a system for a tanker plane entering a rendezvous orbit with a plane to be refueled, that includes entering a holding pattern. It does not disclose the use of the differential equations of the instant invention. It is designed for military operations, and for airspace that is designed specifically for an air refueling mission, not for civilian holding patterns, as is the instant invention.

U.S. Pat. No. 6,847,866, issued on Jan. 25, 2005, to Chad E. Gaier, discloses shortened aircraft holding patterns using FMS. It does not disclose the use of the differential equations of the instant invention. It is for exiting a hold, not staying in the hold, and it does not indicate whether you are within the FAA protected airspace, as does the instant invention.

U.S. Pat. No. 7,003,383, issued on Feb. 21, 2006, to Jim R. Rumbo et al., discloses a flight management system using holding pattern entry algorithms. It does not disclose the use of the differential equations of the instant invention. Its algorithms are specifically for hold entries (teardrop, parallel and direct) and it does not account for Federal Aviation Administration (FAA) holding space parameters, as does the instant invention.

U.S. Pat. No. 7,152,332, issued on Dec. 26, 2006, to Ashish Kumar Jain and Gerald Lamar Miley, discloses a navigational assist system for determining entry procedures for holding and runway traffic patterns. It is a simplistic mechanical device, rather than a method using an electronic device as in the instant invention, that calculates outbound headings and wind corrections, and depicts holding space limits.

U.S. Pat. No. 7,370,790, issued on May 13, 2008, to Jan Martincik and Jana Martincikova, discloses an apparatus for visualizing and determining a holding pattern and entry procedure. It is a mechanical device, rather than a method using an electronic device as in the instant invention. It is a visual aid to identify the quadrant the plane is flying in for teardrop, parallel and direct holding pattern entries. It does not correct for wind, nor provide information on an outbound heading or airspace, as does the instant invention.

U.S. Pat. No. 7,903,000, issued on Mar. 8, 2011, to Jason L. Hammack et al., discloses a system for representing a holding pattern on a vertical situation display. It does not disclose the use of the differential equations of the instant invention. It does not show a wind compensated holding pattern and FAA protected airspace, as does the instant invention.

U.S. Pat. No. Des. 377,942, issued on Feb. 11, 1997, to John K. McCloy, discloses a design for a multi-layer rotary holding pattern entry calculator. Again, it is a mechanical device, rather than a method for using an electronic device as in the instant invention. It is for entry information only, not the hold itself. It does no wind or heading calculations, as does the instant invention.

U.S. Patent Application Publication No. 2009/0319100, issued on Dec. 24, 2009, to Nitin Anand Kale and Keshav Rao, discloses systems and methods for defining and rendering a trajectory of an aircraft. It may be used for holding patterns (see the next to the last sentence in paragraph 0049 on page 7). Again, it does not disclose the use of the differential equations of the instant invention. It may re-label a way point as a holding way point. It does not calculate holding patterns to stay within depicted FAA holding airspace, as does the instant invention.

Japanese Patent No. 7-104853, published on Apr. 21, 1995, inventors Takashi Oki, Masahiro Hattori and Naoyuki Yamashita, discloses an automatically guided flight system for an airplane, capable of following an airplane in a turning course while holding a turning radius. It does not appear to be designed to calculate holding patterns, as in the instant invention.

None of the above inventions and patents, taken either singly or in combination, is seen to describe the instant invention as claimed.

SUMMARY OF THE INVENTION

The present invention is a method of calculating aeronautical holding patterns, that can be used with any aircraft or combination of instruments that can define a bearing, comprising the steps of: defining navigational way points using their latitude and longitude coordinates; displaying the latitude and longitude that define the point for an inbound turn; defining four posts of a holding pattern; showing the actual holding space dimensions along with the non-protected airspace; and determining the necessity for a figure eight holding pattern. The method may be performed by a stand-alone electronic device or an aircraft equipped electronic device having other functions. The latitude and longitude that define the point for an inbound turn can be displayed as a bearing, as a distance along a bearing, or both. The inbound turning point can be incorporated into and automatically calculated using a global positioning system or flight management system. A turn may be commanded using an automatic flight control system or a flight director. The holding pattern can be drawn to the correct shape with regards to wind direction and velocity, or used as an overlay over a representation of terrain.

Accordingly, it is a principal object of the invention to further simplify the process of flying an airplane or other aerial vehicle in a holding pattern.

It is another object of the invention to improve air safety by enabling pilots to fly holding patterns more accurately and with less distraction.

It is a further object of the invention to prevent unnecessary fuel consumption from errors in flying holding patterns.

Still another object of the invention is to provide methods that will be useful in training new pilots to fly holding patterns.

It is an object of the invention to provide improved elements and arrangements thereof in an apparatus for the purposes described which is cost effective, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
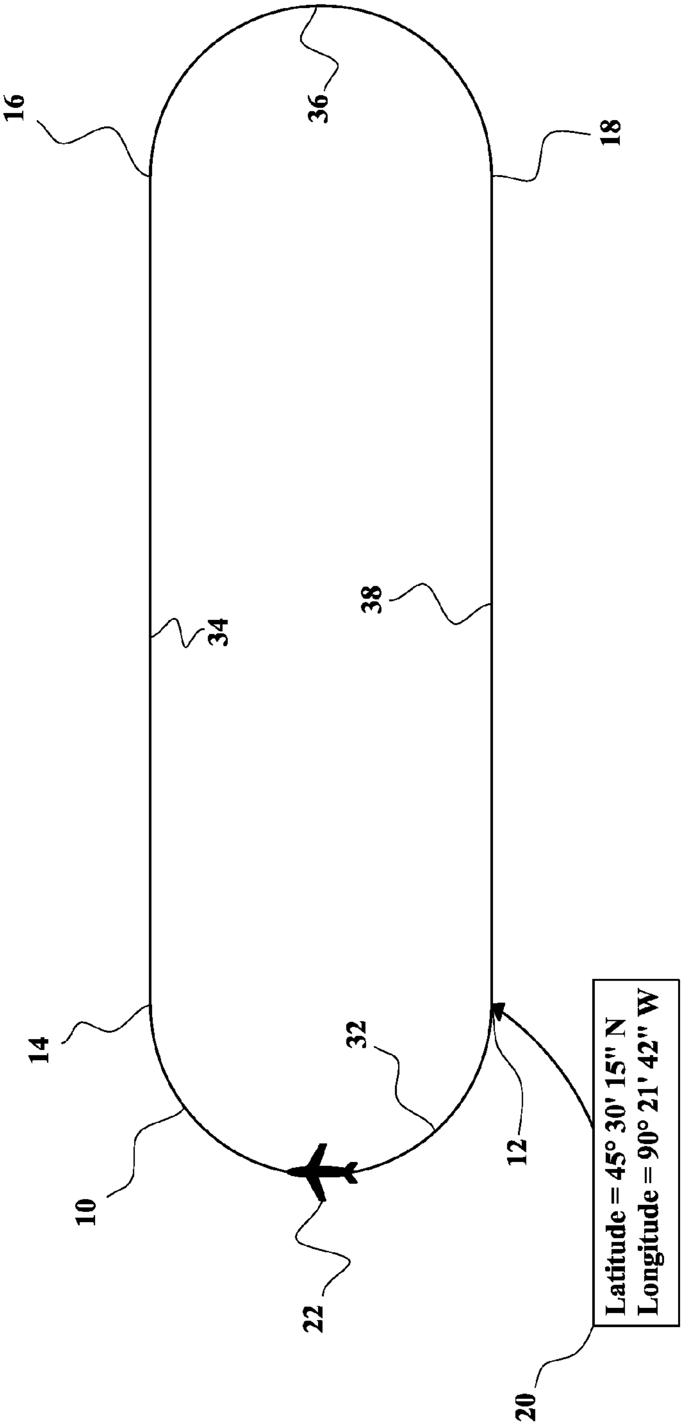
FIG. 1 is graphical representation of a holding pattern using the invention.

The present invention is a calculator (or calculation method) that may be used as (or with) a stand alone electronic device or linked (or used) with a smart phone, IPAD, tablet or laptop computer, flight management system ("FMS") or any other digital electronic media used in aircraft or unmanned aerial vehicle ("UAV") navigation or flight planning.

All navigational way points such as global positioning system ("GPS"), user defined way points, VOR (Very high frequency Omnidirectional Range), VOR/VOR, VOR/DME (Distance Measuring Equipment), TACAN (TACtical Air Navigation), NDB (NonDirectional radio Beacon), NDB/VOR and Marker Beacons will be defined using their latitude and longitude coordinates. The latitude and longitude that define the point for the turn inbound may be displayed as a bearing 20 (shown in FIG. 1) or distance along a radial, or both.

A bearing may be identified using VOR needles, HSI (Horizontal Situation Indicator) needles, ADF (Automatic Direction Finder) needles, or FMS bearing pointers. Additionally, the FMS or GPS will automatically calculate the turning point inbound based on the mentioned navigation algorithms and procedures. It will then command a turn, based on the same algorithms, through the Automatic Flight Control System ("AFCS" or "autopilot") or Flight Director if flown manually (at the standard rate or as limited by the manufacturer—usually 25 to 30 degrees) to remain in the protected airspace and roll out on the correct inbound course.

A NAVAID (short for navigation aid) is any visual or electronic device, airborne or on the surface, which provides point-to-point guidance information or position data to aircraft in flight. NAVAIDs send out radio signals that an airplane's tuned receiver picks up. The signals may then be tracked using radials or bearings. A waypoint is a reference point in physical space used for navigation. It can be a VOR or GPS identified point. All have longitude and latitude identifiable positions along with a name.

The inbound leg is a straight line path of flight, of one to one and a half minutes duration, that ends at a position called the fix. As the airplane passes over the fix, the pilot begins the outbound turn by banking the plane to a bank angle. As the plane approaches a specified outbound heading, the pilot levels the plane and flies on that heading until the bearing back to the NAVAID is a specified value. He then banks the plane to the same bank angle as before, beginning the inbound turn and continues that turn until the plane reaches the start of the inbound leg. The pilot then levels the wings and uses a defined wind corrected heading to fly the inbound course to the fix and repeats the entire process, until given instructions to proceed from the hold.

The four posts of a holding pattern are the four positions at which changes in flight are made; they are the end of the inbound leg, the end of the outbound turn, the end of the outbound leg, and the beginning of the inbound leg. The holding fix is the only identifiable post in timed holding. Timing of the outbound leg starts abeam the fix or when the wings are level after the turn, whichever comes later. Timing of the inbound leg starts with wings level. The end of the outbound leg is identified using a bearing, or DME along a radial.

The four posts of a holding pattern will be defined onto the depicted, wind corrected holding pattern selected. The actual holding space dimensions will be viewable in relation to the hold and non-protected airspace. FIG. 1 shows a holding pattern 10, with the four posts 12, 14, 16 and 18, the inbound turn 32 between 12 and 14, the inbound leg 34 between 14 and 16, the outbound turn 36 between 16 and 18, and the outbound leg 38 between 18 and 12.

The holding pattern will be drawn to the correct shape with regards to the prevailing winds (defined by wind direction and velocity). This shape will be represented within the protected holding pattern airspace. This pictorial display may also be used as an overlay to show the pilot actual representation of terrain associated with the hold. A moving target 22 representing the aircraft (shown in FIG. 1) will also be displayed showing the pilot the aircraft's position throughout the hold.

Figure 2:
FIG. 2 is graphical representation of a warning regarding flight speed given by the invention.
Figure 3:
FIG. 3 is a graphical representation of a warning regarding wind speed given by the invention.

Variable airspeeds will be used with the wind calculations to maintain the aircraft within the protected airspace. Standard FAA (Federal Aviation Administration), ICAO (International Civil Aeronautics Organization), military holding airspeeds, and altitudes will be applied during the calculations of algorithms. With a given bank angle, and starting from the maximum airspeed for a given altitude, three patterns will be displayed. The airspeed for the first pattern will indicate the maximum holding airspeed for that altitude. The second pattern will indicate the maximum airspeed minus 15%, and the third pattern will indicate maximum airspeed minus 30%. The variable airspeed will solve the problem of wind speed to aircraft speed, being outside of a defined workable solution where the wind speeds are equal to 25% or more of the aircraft's speed. If the aircraft is flying too fast or the wind speeds are too great to remain within the protected holding airspace, a message will be generated to notify the pilot that the aircraft will not remain inside the protected airspace. FIG. 2 shows a screen 24 on which a warning regarding flight speed 28 is displayed. A speaker 26 may also give an audible warning 26. FIG. 3 shows a warning regarding wind speed 30. For aircraft utilizing an FMS, current information will be taken from the aircraft's onboard computers and sensors and applied to the aircraft's current position.

The FAA has specified the extents and shapes of areas the plane must remain within to be within the holding space dimensions. These envelopes vary with altitude and air speed and are constructed using compasses and rulers. There are many such envelopes. In our program, we have simplified the shape to two straight lines and two semi-circles. If a plane remains within our envelope, it will also be inside the FAA envelope for that altitude and speed. If a plane is outside the FAA envelope, it is in non-protected airspace.

Maximum allowed holding pattern airspeeds will be as specified in Holding Pattern Criteria, paragraphs 2-8.a or 2-8.b, as applicable, pursuant to FAA Order 7130.3A, including all modifying FAA Memoranda, or its successor regulations. Use Table 1: Maximum Holding Airspeeds, page 2-2, FAA Order 7130.3A, including all modifying FAA Memoranda, or its successor regulations, with the "airplane type" input (described below) to identify the maximum allowed holding pattern airspeed. Use Table 2: Holding Pattern Selection Chart, pages 2-3 through 2-5, "FAA Order 7130.3A, including all modifying FAA Memoranda, or its successor regulations, with the maximum allowed holding pattern airspeed from Table 1 and the inputs for FIX-to-NAVAID distance and holding altitude to identify the FAA template to apply to the holding pattern. The full size of the holding pattern for holding patterns in a location and at an altitude as published by the FAA or as assigned by FAA Air Traffic Control, shall be evaluated for obstacle clearance in accordance with FAA Order 7130.3A, including all modifying FAA Memoranda, paragraph 2-5, or its successor regulations.

Left and right hand turns in holding patterns in FAA template tracing shall be accounted for in accordance with FAA Order 7130.3A, including all modifying FAA Memoranda, paragraphs 2-30.a and 2-30.b or its successor regulations.

The electronic holding pattern calculator will not be limited to solving the mathematical algorithms using arrays and tables alone. As technology advances and better digital electronic computing devices are developed, the holding pattern calculator will utilize that technology to calculate the holding pattern computations in real time without the use of tables and arrays by using the increased computing power of such devices. Some of these capabilities will include and not be limited to: real-time data inputs provided by the FMS instead of user prompted inputs, and automatically determining whether the hold needs to be 1.0 minute or 1.5 minutes inbound based on the current aircraft altitude.

Beginning at the end of the inbound leg (the fix) and triangulating once per second, the program generates an entire 360-degree turn using a selected bank angle and air speed. That curve is translated such that its end point is moved to the start of the inbound leg. A portion of the original curve will form the outbound turn and a portion of the translated curve will form the inbound turn. A search routine was used to locate the two points at which a straight line was tangent to both curves. The tangent point on the original curve is the start of the outbound leg. The tangent point on the translated curve is the end of the outbound leg. Because positions and bearings are known for all points on both curves, the program reports the bearing at the start of the outbound leg and calculates the bearing back to the NAVAID at the end of the outbound leg and that position is the start of the inbound turn.

When using triangulation to determine the path of a plane relative to the ground, the input values include bearing, altitude-corrected air speed, wind speed, and wind bearing. The spiral path generated includes the effect of wind. "Spiral path" is defined as a curved path with a continuously increasing radius of curvature. The FAA specifies maximum air speeds for holding patterns. Those vary with the type of aircraft and with altitude. The FAA also limits bank angles. Holding patterns that are smaller, are more likely to remain within protected space, with slower air speeds and greater bank angles. The program allows the pilot to select a bank angle and produces patterns for several air speeds equal to and less than the FAA maximum. The patterns are displayed graphically on the computer screen with the appropriate FAA envelope. The pilot can then visually select a pattern that remains within the protected space. If none do, he can rerun the program using a greater bank angle.

Using a known formula and the specified altitude, altitude-corrected air speeds are calculated from instrument-indicated air speeds. The altitude-corrected air speeds are used in the triangulation process along with other inputs to generate the path of the aircraft relative to the ground.

The computer program generates a graph for each of several air speeds. Each graph shows the path of the plane and the FAA envelope. The pilot can see visually where the path of the aircraft exits the envelope. He then selects a pattern that does not exit protected space and flies at that air speed.

In the present invention, the pilot uses a Flight Management System ("FMS") by inputting the required information to the computer and executing the program. He then selects one of the generated patterns to fly. The FMS is not a navigation system in itself. Rather, it is a system that automates the tasks of managing the onboard navigation systems. FMS's also perform other onboard management tasks.

FMS is an interface between flight crews and flight-deck systems. FMS can be thought of as a computer with a large database of airport and NAVAID locations and associated data, aircraft performance data, airways, intersections, departure procedures ("DPs"), and standard terminal arrival routes ("STARs"). FMS also has the ability to accept and store numerous user-defined waypoints, flight routes consisting of departures, waypoints, arrivals, approaches, alternates, etc. FMS can quickly define a desired route from the aircraft's current position to any point in the world, perform flight plan computations, and display the total picture of the flight route to the crew.

FMS also has the capability of controlling (selecting) VOR, DME, and localizer ("LOC") NAVAIDs, and then receiving navigational data from them. Inertial Navigation System ("INS"), Long Range Navigation ("LORAN"), and GPS navigational data may also be accepted by the FMS computer. The FMS may act as the input/output device for the onboard navigation systems, so that it becomes the "go-between" for the crew and the navigation systems.

At startup, the crew programs the aircraft location, departure runway, DP (if applicable), waypoints defining the route, approach procedure, approach to be used, and routing to alternate. This may be entered manually, be in the form of a stored flight plan, or be a flight plan developed in another computer and transferred by disk or electronically to the FMS computer. The crew enters this basic information in the control/display unit (CDU). Once airborne, the FMS computer channels the appropriate NAVAIDs and takes radial/distance information, or channels two NAVAIDs, taking the more accurate distance information. FMS then indicates position, track, desired heading, groundspeed and position relative to desired track. Position information from the FMS updates the INS. In more sophisticated aircraft, the FMS provides inputs to the horizontal situtation indicator ("HSI"), radio-magnetic indicator ("RMI"), glass cockpit navigation displays, head-up display ("HUD"), autopilot, and autothrottle systems.

Once the required input information has been entered, within two to three minutes, depending on computer speed, the program calculates and displays the several patterns. An Automated Surface Observing System ("ASOS"), Automated Terminal Information Service ("ATIS"), Meteorological Terminal Aviation Routine weather reports ("METAR"), Terminal Aerodrome Forecast ("TAF"), or WINDS ALOFT may be used as data sources.

The inputs required for our computer program, whether entered by a flight management system or by the pilot, are latitude, longitude, and altitude of the NAVAID, the FAA number designation for the type of aircraft, the altitude of the aircraft during holding, the NAVAID to FIX distance and bearing, the direction of the outbound turn (right or left), the wind speed and bearing, the hold bearing, and the bank angle during turns. Micro Air Data Computers ("MADCs") provide to the FMS Barometric Altitude, Pressure Altitude, Indicated Airspeed, True Airspeed, Mach number, Vertical Airspeed, Maximum Operating Airspeed, Static and Total Air Temperature. (The true air speed computation is derived from calibrated airspeed, temperature, and pressure altitude). The MSU (Magnetic Sensor Unit) detects the horizontal component of the earth's magnetic field and transmits it to the Attitude and Heading Reference Unit ("AHRU") for use as long term heading reference. In MSU calibration mode, the AHRU determines the MSU calibration coefficients used for compensation of single and dual cycle MSU errors. The MSU calibration algorithm is able to compensate single and dual cycle errors in sum up to 12 degrees. The AHRS is a strap down inertial measurement system using fiber optic rate gyros and micromechanical accelerometers that are "strapped down" to the principle aircraft axes. A digital computer mathematically integrates the rate data to obtain heading, pitch, and roll.

The FAA specifies a one-minute inbound leg for altitudes less than or equal to 14,000 feet. Above 14,000 feet, the inbound leg is 1.5 minutes. The time elapsed during the outbound leg is calculated from the ground speed and the distance between the starting point of the leg and its end.

The steps in using the present invention to calculate a left or right hand aeronautical holding pattern can be summarized as follows:

(a) determining wind speed and direction;

(b) choosing a direction of a holding pattern from the group comprising left-hand and right-hand;

(c) selecting a start point and an end point of an inbound leg of the holding pattern;

(d) generating, with an electronic processor and by solving differential equations (or by repeated triangulation), a spiral path of an aircraft given the wind speed and direction determined in step (a) making a turn in the direction chosen in step (b);

(e) copying and translating the spiral path, with the electronic processor, so that for a first copy its starting point is the end point of the inbound leg selected in step (c), and for a second copy its ending point is the start point of the inbound leg selected in step (c);

(f) running a search routine, with the electronic processor, to locate positions on the first and second copy of the spiral path that have, as close as possible, the same bearing; and (g) making the positions located in step (f) the start and end points of an outbound leg of the holding pattern;

(h) notifying a pilot, using the electronic processor, of a maximum allowed holding pattern airspeed for an aircraft;

(i) inputting a bank angle selected by the pilot into the electronic processor;

(j) generating and displaying, using the electronic processor, holding patterns for the maximum allowed airspeed and at least two lesser airspeeds;

(k) displaying boundaries of a protected airspace within which the aircraft must fly with the holding patterns of step (j), enabling the pilot to see if the holding patterns are within the protected airspace;

(l) if none of the holding patterns of step (j) are within the protected airspace, enabling the pilot to input a greater bank angle into the electronic processor, and generating and displaying new holding patterns using the electronic processor; and (m) using global positioning data to display the position of the aircraft in the display of the holding patterns and boundaries of the protected airspace.

If there is no wind, the spiral path becomes circular. All of these steps will require the use of a computer or other electronic processor, which may be a stand alone device, or integrated into the system of an aircraft. Without generating projections from both the first and second copy of the spiral path simultaneously, one will frequently identify incorrect points.

If the spiral path generated in step (d) is generated by solving differential equations, it is preferably constructed from solutions of the following differential equations, where the fix is the ending point of the inbound leg, and is set at the origin (0, 0), and the x- and y-positions (with x being the east-west dimension and y being the north-south dimension), with east and north being the postive directions) of the aircraft at time t (in seconds) are:

$$x=as\{\sin\,[abo+(dps)t]/dps\}+ws[\cos(wb)]t$$

$$y=-as\{\cos\,[abo+(dps)t)]/dps\}+ws[\sin(wb)]t$$

wherein:

dps=rate of change in the bearing in radians per second;

as=air speed in meters per second;

ws=wind speed in meters per second;

wb=standard position angle representation of the wind bearing in radians; and abo=inbound bearing in radians represented as an angle in standard position.

An important advantage of the present invention relates to variable bank and airspeed. Bank is usually constant and maintained with the flight director and autopilot. Allowing the pilot to alter the bank and then choose an airspeed appropriate for the hold is a unique feature, especially when combined with the visual presentation. Incoming GPS data may be stored in a file that is repetitively read into the computer program, which then displays the position of the aircraft on the same graph as the holding pattern.

The following are examples of using the present invention to calculate right hand (clockwise) holding patterns, showing prompts and output displayed by the computer, and data input by the user in bold: (Everything is displayed, except what is enclosed in parentheses, but including what is enclosed in brackets and single digits enclosed in parentheses.)

After each input, type a semicolon and then press Enter. Input NAVAID latitude in brackets, [N or S,degrees,minutes,seconds] Type semicolon. Press ENTER. [N,31,38,16];

Input NAVAID longitude in brackets, [E or W,degrees,minutes,seconds] Type semicolon. Press ENTER. [W,97,4,45];

Input NAVAID elevation in feet. Type semicolon. Press ENTER. 516;

Civil Aircraft (Classified by Maximum Holding Altitude ("MHA"))

(1) MHA through 6,000 ft.

(2) Above 6,000 ft through 14,000 ft (3) Above 14,000 ft

Military Aircraft (4) All except aircraft listed below (5) T-38, F-15, and F-16

(6) USAF F-4 Aircraft (7) B-1, F-111, and F-5

(8) T-37

Input the integer of plane type followed by semicolon.

Then press ENTER. 3;

("Plane type" for civil aircraft is used loosely to refer to altitude range.)

MAXIMUM AIRSPEED=265 KIAS

Figure 8:
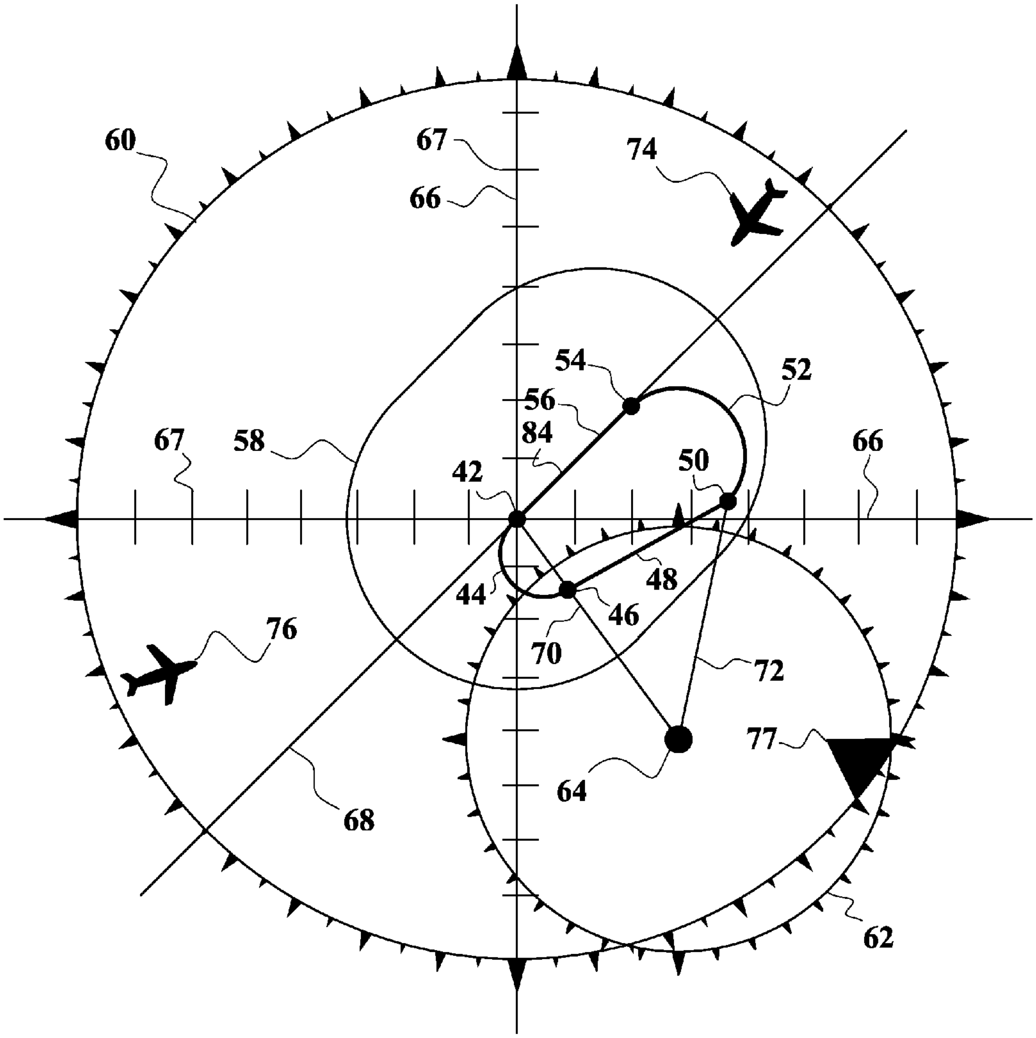
FIG. 8 is a graphical representation of a second left hand holding pattern generated using the invention.

Input altitude in feet (No commas) followed by semicolon. Then press ENTER. 15000;

Input NAVAID to FIX distance in NM followed by semicolon. Then press ENTER. 12;

Input NAVAID to FIX bearing in degrees followed by semicolon. Then press ENTER. 325;

Input holding bearing in degrees. 45;

Input 1 for Right Turn, 2 for Left Turn, 3 for FIG. 8.

Type semicolon. Then press ENTER. 1;

Input wind speed in knots. 30;

Input direction wind is blowing FROM, in degrees. 125;

Input bank angle in degrees. 20;

LATITUDE OF FIX=N 31 degrees, 48.08 minutes.

LONGITUDE OF FIX=W 97 degrees, 12.84 minutes.

FIX to NAVAID SLANT DME=12.23 NM

Holding Bearing=045 degrees.

Inbound Bearing=225 degrees.

Altitude=15000 feet.

Wind Blowing From=125 degrees.

Wind Blowing Toward=305 degrees.

Wind Speed=30 knots.

Figure 4:
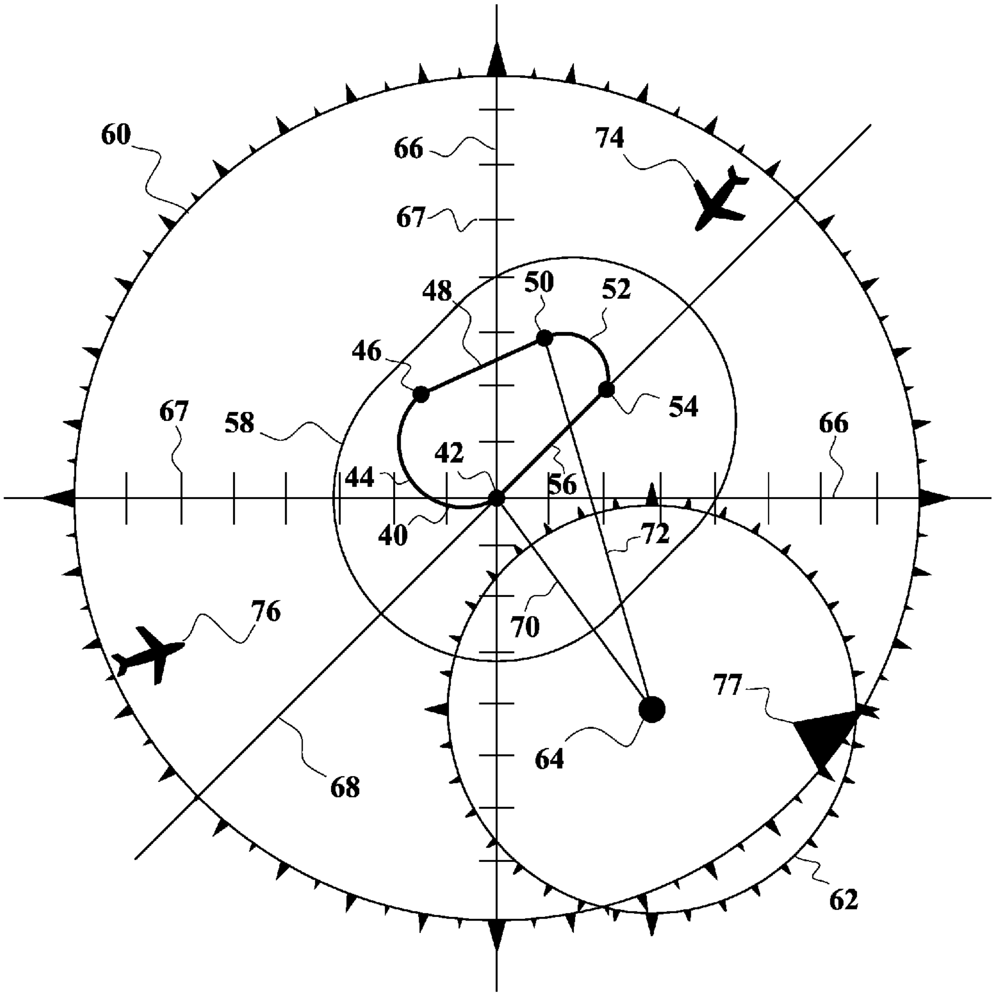
FIG. 4 is a graphical representation of a first right hand holding pattern generated using the invention.

PATTERN 1 (40 shown in FIG. 4):

Indicated Inbound Air Speed=186 knots.

Altitude-Corrected Inbound Air Speed=241 knots.

Inbound ground speed=245 knots.

WIND CORRECTED INBOUND BEARING=218 degrees.

Turn "RIGHT" (at FIX 42) with bank angle=20 degrees [1.65 degrees/second] (the outbound turn 44) to outbound wind corrected bearing of 67 degrees (at post 46, the start of outbound leg 48).

Fly on that outbound heading for 105 seconds until the bearing back to NAVAID is 165 degrees (at post 50, the end of the outbound leg).

Turn "RIGHT" with bank angle=20 degrees [1.65 degrees/second] (the inbound turn 52) back to the start (at post 54) of inbound leg 56. (The end of the inbound leg is 42, the FIX where the holding pattern started and may be repeated.)

Latitude at end of outbound leg=N 31 degrees, 55.54 minutes.

Longitude at end of outbound leg=W 97 degrees, 10.24 minutes.

DME to NAVAID at end of outbound leg=18.07 NM.

(Area enclosed in oval 58 is a) Subset of FAA Basic Template 15 (indicating the area within which the holding pattern is supposed to be contained).

Inbound leg=6.13 NM, Template 15 LM=9.60 NM, LI=7.70 NM.

(Directions are indicated by the larger circle 60 with compass points surrounding the FIX and the smaller circle 62 with compass points surrounding the NAVAID 64. Cross lines 66 and nautical mile markers 67 indicate distance from the FIX. Line 68 indicates the direction of the inbound leg, which is toward the lower left. Line 70 indicates the distance and direction from the FIX to the NAVAID. Line 72 indicates the direction of the point 50 at which the outbound leg ends and the inbound turn begins to the NAVAID. Icon 74 indicates the wind corrected inbound heading. Icon 76 indicates the outbound wind corrected heading. Triangle 77 indicates the wind direction. The oval 58 is formed by two semicircles connected by straight line segments. One of the semicircles is centered on the FIX. LM is the distance between the fix and the center of the other semicircle. LI is the radius of both semicircles.)

Figure 5:
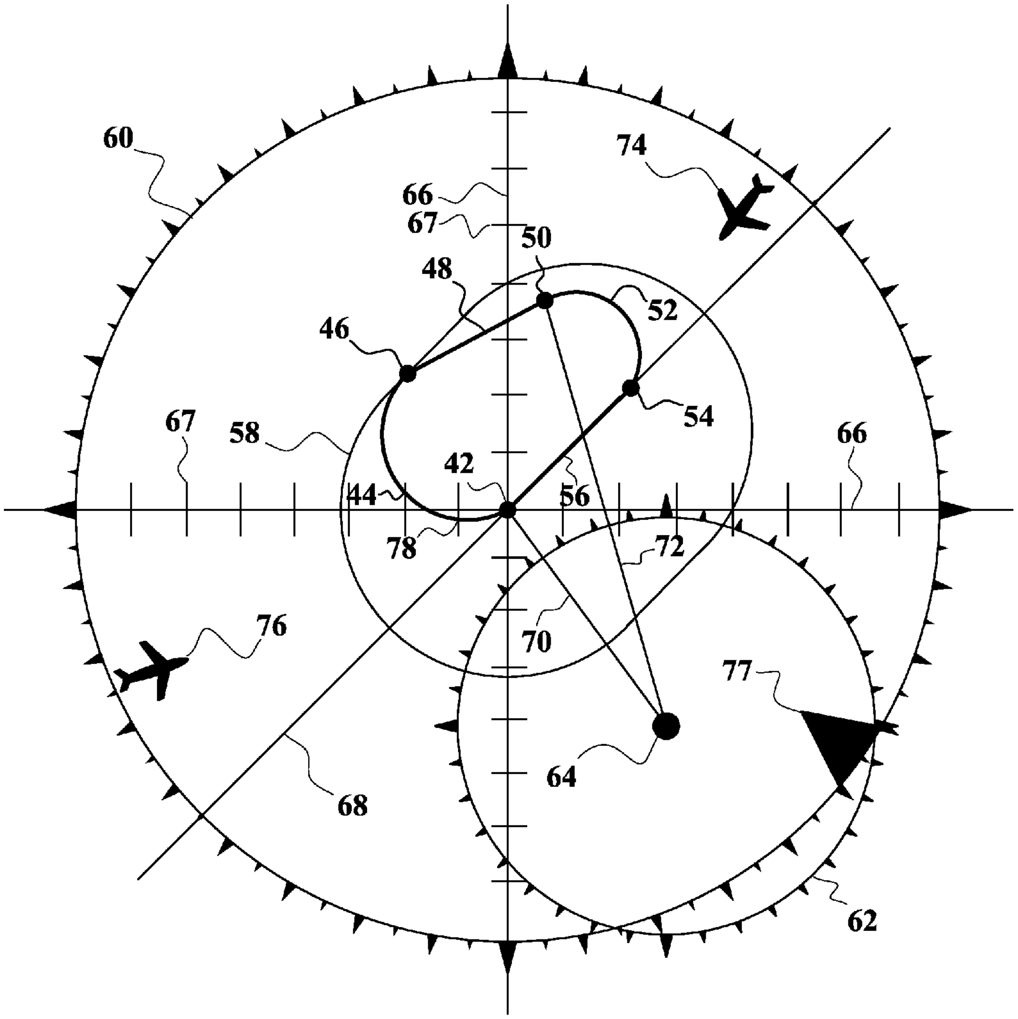
FIG. 5 is a graphical representation of a second right hand holding pattern generated using the invention.

PATTERN 2 (78 shown in FIG. 5):

Indicated Inbound Air Speed=225 knots.

Altitude-Corrected Inbound Air Speed=293 knots.

Inbound ground speed=297 knots.

WIND CORRECTED INBOUND BEARING=219 degrees.

Turn "RIGHT" (at FIX 42) with bank angle=20 degrees [1.36 degrees/second] (the outbound turn 44) to outbound wind corrected bearing of 67 degrees (at post 46, the start of outbound leg 48).

Fly on that outbound heading for 104 seconds until the bearing back to NAVAID is 166 degrees (at post 50, the end of the outbound leg).

Turn "RIGHT" with bank angle=20 degrees [1.36 degrees/second] (the inbound turn 52) back to start (at post 54) of inbound leg (56). (The end of the inbound leg is 42, the FIX where the holding pattern started and may be repeated.)

Latitude at end of outbound leg=N 31 degrees, 58.09 minutes.

Longitude at end of outbound leg=W 97 degrees, 10.51 minutes.

DME to NAVAID at end of outbound leg=20.58 NM.

(Area enclosed in oval 58 is a) Subset of FAA Basic Template 15.

Inbound leg=7.42 NM, Template 15 LM=9.60 NM, LI=7.70 NM.

Figure 6:
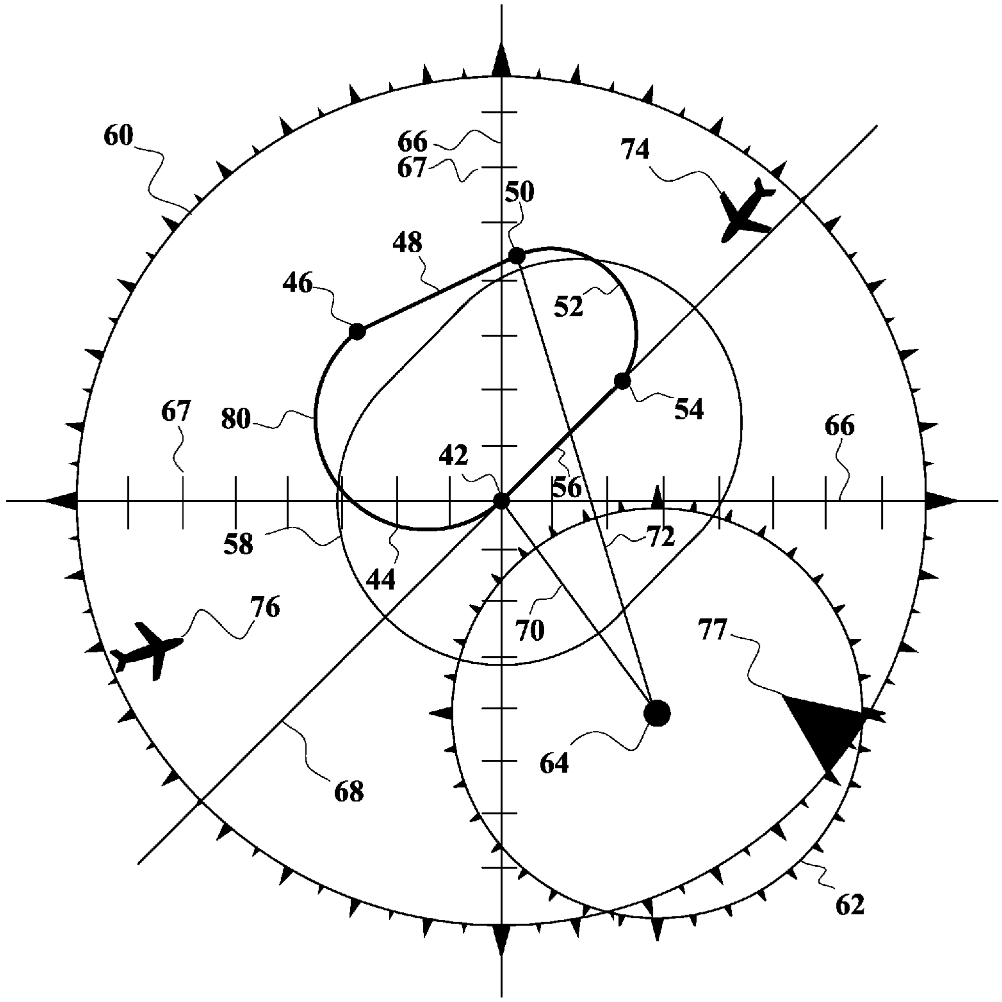
FIG. 6 is a graphical representation of a third right hand holding pattern generated using the invention.

PATTERN 3 (80 shown in FIG. 6):

Indicated Inbound Air Speed=265 knots.

Altitude-Corrected Inbound Air Speed=344 knots.

Inbound ground speed=348 knots.
WIND CORRECTED INBOUND BEARING=220 degrees.
Turn "RIGHT" (at FIX 42) with bank angle=20 degrees (1.15 degrees/second) (the outbound turn 44) to outbound wind corrected bearing of 65 degrees (at post 46, the start of outbound leg 48).
Fly on that outbound heading for 103 seconds until the bearing back to NAVAID is 167 degrees (at post 50, the end of the outbound leg).
Turn "RIGHT" with bank angle=20 degrees (1.15 degrees/second)(the inbound turn 52) back to start (at post 54) of inbound leg 56. (The end of the inbound leg is 42, the FIX where the holding pattern started and may be repeated.)
Latitude at end of outbound leg=N 32 degrees, 0.96 minutes.
Longitude at end of outbound leg=W 97 degrees, 11.13 minutes.
DME to NAVAID at end of outbound leg=23.48 NM.
(Area enclosed in oval 58 is a) Subset of FAA Basic Template 15. (Note that this holding pattern passes outside where FAA regulations say that it should be.)
Inbound leg=8.70 NM, Template 15 LM=9.60 NM, LI=7.70 NM.

(The following are examples of using the present invention to calculate left hand (counterclockwise) holding patterns, showing prompts and output displayed by the computer, and data input by the user in bold:)

Figure 7:
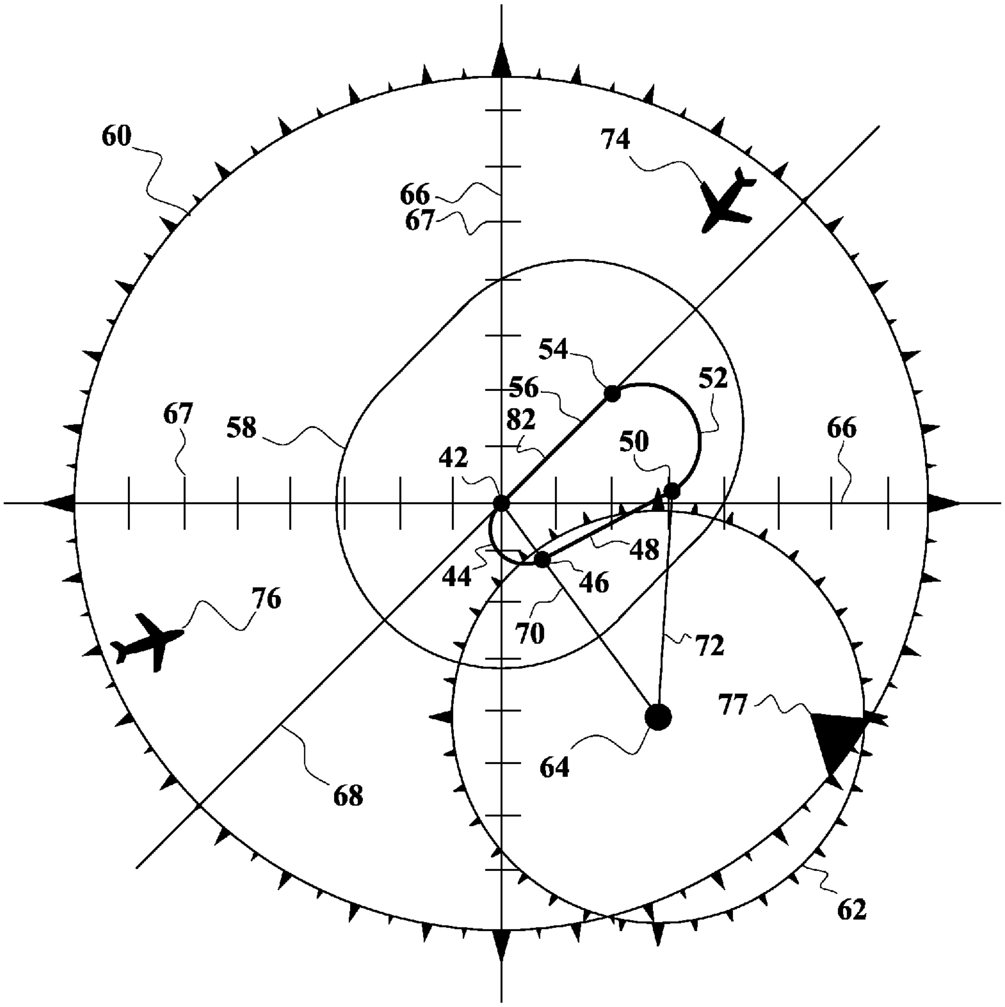
FIG. 7 is a graphical representation of a first left hand holding pattern generated using the invention.
Figure 9:
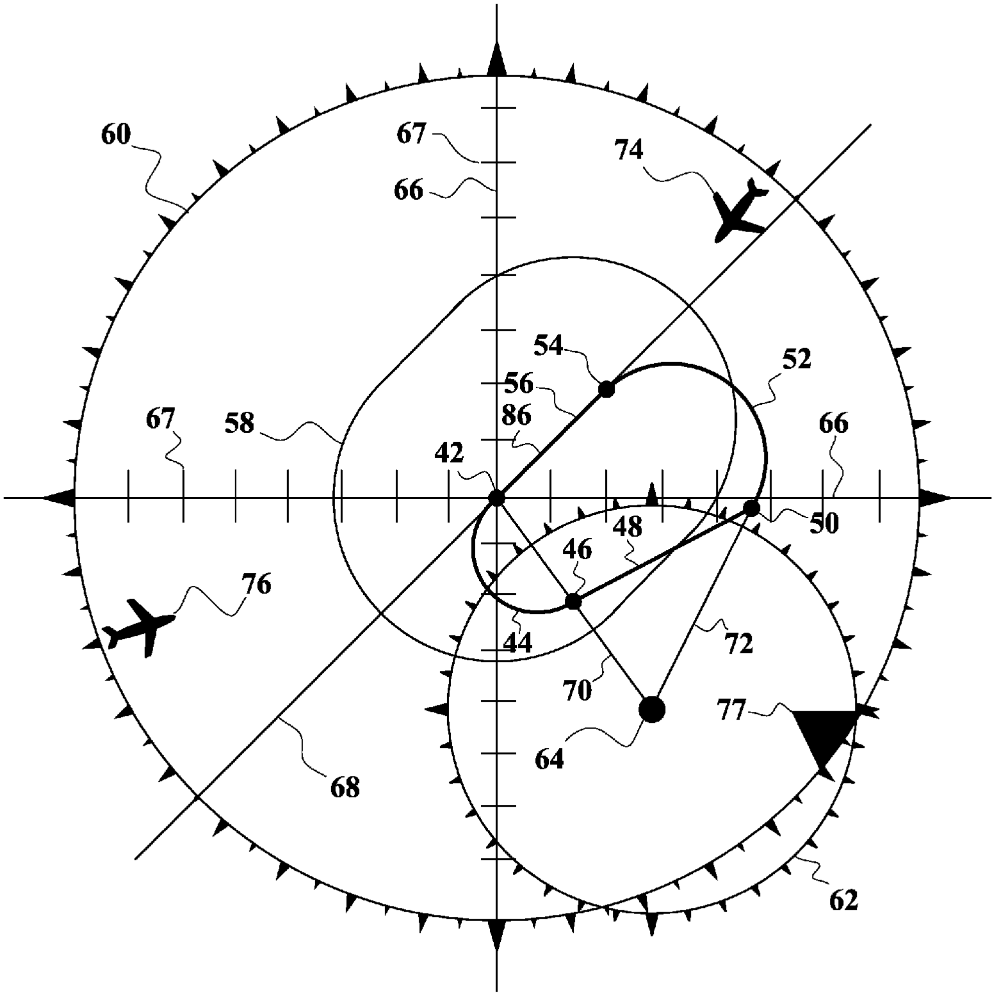
FIG. 9 is a graphical representation of a third left hand holding pattern generated using the invention.

After each input, type a semicolon and then press Enter.
Input NAVAID latitude in brackets,
[N or S, degrees, minutes, seconds] Type semicolon. Press ENTER. [N,31,38,16];
Input NAVAID longitude in brackets,
[E or W, degrees, minutes, seconds] Type semicolon. Press ENTER. [W,97,4,45];
Input NAVAID elevation in feet. Type semicolon. Press ENTER. 516;
Civil Aircraft
(1) MHA through 6,000 ft.
(2) Above 6,000 ft through 14,000 ft
(3) Above 14,000 ft
Military Aircraft
(4) All except aircraft listed below
(5) T-38, F-15, and F-16
(6) USAF F-4 Aircraft
(7) B-1, F-111, and F-5
(8) T-37
Input the integer of plane type followed by semicolon.
Then press ENTER. 3;
MAXIMUM AIRSPEED=265 KIAS
Input altitude in feet (No commas) followed by semicolon.
Then press ENTER. 15000;
Input NAVAID to FIX distance in NM followed by semicolon.
Then press ENTER. 12;
Input NAVAID to FIX bearing in degrees followed by semicolon.
Then press ENTER. 325;
Input holding bearing in degrees. 45;
Input 1 for Right Turn, 2 for Left Turn, 3 for FIG. 8.
Type semicolon. Then press ENTER. 2;
Input wind speed in knots. 35;
Input direction wind is blowing FROM, in degrees. 125;
Input bank angle in degrees. 25;
LATITUDE OF FIX=N 31 degrees, 48.08 minutes.
LONGITUDE OF FIX=W 97 degrees, 12.84 minutes.
FIX to NAVAID SLANT DME=12.23 NM
Holding Bearing=045 degrees.
Inbound Bearing=225 degrees.
Altitude=15000 feet.
Wind Blowing From=125 degrees.
Wind Blowing Toward=305 degrees.
PATTERN 1 (82 shown in FIG. 7):
Indicated Inbound Air Speed=186 knots.
Altitude-Corrected Inbound Air Speed=241 knots.
Inbound ground speed=245 knots.
WIND CORRECTED INBOUND BEARING=217 degrees.
Turn "LEFT" (at FIX 42) with bank angle=25 degrees [2.11 degrees/second] (the outbound turn 44) to outbound wind corrected bearing of 69 degrees (at post 46, the start of outbound leg 48).
Fly on that outbound heading for 106 seconds until the bearing back to NAVAID is 182 degrees (at post 50, the end of the outbound leg).
Turn "LEFT" with bank angle=25 degrees [2.11 degrees/second] (the inbound turn 52) back to start (at post 54) of inbound leg (56). (The end of the inbound leg is 42, the FIX where the holding pattern started and may be repeated.)
Latitude at end of outbound leg=N 31 degrees, 49.07 minutes.
Longitude at end of outbound leg=W 97 degrees, 4.31 minutes.
DME to NAVAID at end of outbound leg=11.09 NM.
(Area enclosed in oval 58 is a) Subset of FAA Basic Template 15.
Inbound leg=6.13 NM, Template 15 LM=9.60 NM, LI=7.70 NM.
PATTERN 2 (84 shown in FIG. 8):
Indicated Inbound Air Speed=225 knots.
Altitude-Corrected Inbound Air Speed=293 knots.
Inbound ground speed=297 knots.
WIND CORRECTED INBOUND BEARING=218 degrees.
Turn "LEFT" (at FIX 42) with bank angle=25 degrees [1.74 degrees/second] (the outbound turn 44) to outbound wind corrected bearing of 67 degrees (at post 46, the start of outbound leg 48).
Fly on that outbound heading for 105 seconds until the bearing back to NAVAID is 194 degrees (at post 50, the end of the outbound leg).
Turn "LEFT" with bank angle=25 degrees [1.74 degrees/second] (the inbound turn 52) (back to start (at post 54) of inbound leg 56).
Latitude at end of outbound leg=N 31 degrees, 48.58 minutes.
Longitude at end of outbound leg=W 97 degrees, 1.73 minutes.
DME to NAVAID at end of outbound leg=10.92 NM.
(Area enclosed in oval 58 is a) Subset of FAA Basic Template 15.
Inbound leg=7.42 NM, Template 15 LM=9.60 NM, LI=7.70 NM.
PATTERN 3 (86 shown in FIG. 9):
Indicated Inbound Air Speed=265 knots.
Altitude-Corrected Inbound Air Speed=344 knots.
Inbound ground speed=349 knots.
WIND CORRECTED INBOUND BEARING=219 degrees.
Turn "LEFT" with bank angle=25 degrees [1.48 degrees/second] (the outbound turn 44) to outbound wind corrected bearing of 65 degrees (at post 46, the start of outbound leg 48).
Fly on that outbound heading for 104 seconds until the bearing back to NAVAID is 207 degrees (at post 50, the end of the outbound leg).
Turn "LEFT" with bank angle=25 degrees [1.48 degrees/second] (the inbound turn 52) (back to start (at post 54) of inbound leg 56).

Latitude at end of outbound leg=N 31 degrees, 47.84 minutes.
Longitude at end of outbound leg=W 96 degrees, 58.93 minutes.
DME to NAVAID at end of outbound leg=11.06 NM.
(Area enclosed in oval 58 is a) Subset of FAA Basic Template 15. (Note that this holding pattern passes outside where FAA regulations say that it should be.)
Inbound leg=8.73 NM, Template 15 LM=9.60 NM, LI=7.70 NM.

Figure eight holding patterns are a unique alternative to regular holding patterns, that may be used when the winds are very high and are perpendicular to the inbound holding course. The figure eight patterns have two turns into the wind direction, which minimizes the chance of being blown outside of the protected holding airspace. Optimum conditions for these patterns are high velocity winds perpendicular to the inbound course, or not more than +30 degrees or −30 degrees from perpendicular in relation to the inbound course. For example, if the inbound course is on the 360 degree radial, heading 180 degrees (south), and the wind is from 90 degrees (east) at 80 knots or greater. A figure eight pattern would work just as well for that inbound course, heading and wind speed, with wind having a bearing up to 30 degrees less than 90 degrees (e.g., 80, 70 or 60 degrees) or up to 30 degrees more (e.g., 100, 110 or 120 degrees). Except in this type of scenario, a regular holding pattern should be used.

Computer-generated simulated figure eight flight paths indicate holding patterns will occupy less air space as the acute angle between wind direction and the hold bearing increases. Figure eight holding patterns cannot be successfully completed when moderate winds flow close to parallel to the hold bearing. Patterns were generated for the condition where the aircraft turns into wind at both ends of the inbound leg. Patterns differ slightly when the aircraft has a headwind rather than a tailwind on entering the inbound leg. Figure eight holding patterns can be very compact under high wind conditions, provided that the wind direction is nearly perpendicular to the hold bearing. In light winds, Figure eight patterns can be successfully completed only when the wind direction is not close to perpendicular to the inbound leg. Figure eight holding patterns must be more compact than elliptical holding patterns to remain within the airspace required by FAA Order 7130.3A or its successor regulations.

The steps in using the present invention to calculate a figure eight aeronautical holding pattern can be summarized as follows:

(a) determining wind speed and direction;

(b) selecting a start point and an end point of an inbound leg of the holding pattern;

(c) generating, with an electronic processor and by solving differential equations (or by repeated triangulation), a first spiral path of an aircraft given the wind speed and direction determined in step (a) and making a turn into the wind;

(d) copying and translating the first spiral path, with the electronic processor, so that for a first copy its starting point is the end point of the inbound leg selected in step (b), and for a second copy its ending point is the end point of the inbound leg selected in step (b);

(e) generating, with an electronic processor and by solving differential equations (or by repeated triangulation), a second spiral path of an aircraft given the wind speed and direction determined in step (a) and making a turn in the opposite direction from the turn in step (c);

(f) copying and translating the second spiral path, with the electronic processor, so that for a third copy its starting point is the start point of the inbound leg selected in step (b), and for a fourth copy its ending point is the start point of the inbound leg selected in step (b);

(g) running a search routine, with the electronic processor, to locate positions on the first and fourth copies that have, as close as possible, the same air bearing;

(h) making the positions located in step (g) the start and end points of a first straight line portion of the figure eight holding pattern;

(i) running a search routine, with the electronic processor, to locate positions on the second and third copies that have, as close as possible, the same bearing;

(j) making the positions located in step (i) the start and end points of a second straight line portion of the figure eight holding pattern;

(k) notifying a pilot, using the electronic processor, of a maximum allowed holding pattern airspeed for an aircraft;

(l) inputting a bank angle selected by the pilot into the electronic processor;

(m) generating and displaying, using the electronic processor, holding patterns for the maximum allowed airspeed and at least two lesser airspeeds;

(n) displaying boundaries of a protected airspace within which the aircraft must fly with the holding patterns of step (m), enabling the pilot to see if the holding patterns are within the protected airspace;

(o) if none of the holding patterns of step (m) are within the protected airspace, enabling the pilot to input a greater bank angle into the electronic processor, and generating and displaying new holding patterns using the electronic processor; and (p) using global positioning data to display the position of the aircraft in the display of the holding patterns and boundaries of the protected airspace.

Again, if there is no wind, the spiral path becomes circular. As before, all of these steps will require the use of a computer or other electronic processor, which may be a stand alone device, or integrated into the system of an aircraft. Without generating projections from the copies of the spiral paths simultaneously, one will frequently identify incorrect points.

If the first and second spiral paths are generated by solving differential equations, it is preferable that they be constructed from solutions of the following differential equations, where the fix is the ending point of the inbound leg, and is set at the origin (0, 0), and the x- and y-positions of the aircraft at time t (in seconds) are:

$$x=\{[as\sin(abo+(dps)t)]/dps\}+ws\cos(wb)t$$

$$y=-\{[as\cos(abo+(dps)t)]/dps\}+ws\sin(wb)t$$

wherein:

dps=rate of change in the bearing in radians per second;

as=air speed in meters per second;

ws=wind speed in meters per second;

wb=standard position angle representation of the wind bearing in radians; and abo=inbound bearing in radians represented as an angle in standard position.

The following are examples of using the present invention to calculate figure eight holding patterns, showing prompts and output displayed by the computer, and data input by the user in bold. (Everything is displayed, except what is enclosed in parentheses, but including what is enclosed in brackets and single digits enclosed in parentheses.) The following are common to all six patterns, except as indicated:
After each input, type a semicolon and then press Enter.
Input NAVAID latitude in brackets,

[N or S,degrees,minutes,seconds] Type semicolon.

Press ENTER. [N,31,38,16];

Input NAVAID longitude in brackets,

[E or W,degrees,minutes,seconds] Type semicolon. Press ENTER.

Input NAVAID elevation in feet. Type semicolon. Press ENTER. 516;

Civil Aircraft (Classified by MHA)

(1) MHA through 6,000 ft.

(2) Above 6,000 ft through 14,000 ft (3) Above 14,000 ft

Military Aircraft (4) All except aircraft listed below (5) T-38, F-15, and F-16

(6) USAF F-4 Aircraft (7) B-1, F-111, and F-5

(8) T-37

Input the integer of plane type followed by semicolon.

Then press ENTER. 3;

MAXIMUM AIRSPEED=265 KIAS

Input altitude in feet (No commas) followed by semicolon.

Then press ENTER. 15000;

Input NAVAID to FIX distance in NM followed by semicolon.

Then press ENTER. 12;

Input NAVAID to FIX bearing in degrees followed by semicolon.

Then press ENTER. 300;

Input holding bearing in degrees. 45;

Input 1 for Right Turn, 2 for Left Turn, 3 for FIG. 8 Right, 4 for Figure Eight Left. Type semicolon. Then press ENTER. 3;

Input wind speed in knots. 65;

Input direction wind is blowing FROM, in degrees. 325;

(Indicated by triangle 91.)

Input bank angle in degrees. 20;

LATITUDE OF FIX=N 31 degrees, 44.25 minutes.

LONGITUDE OF FIX=W 97 degrees, 16.96 minutes.

FIX to NAVAID SLANT DME=12.23 NM

Xproduct=0.98

Holding Bearing=045 degrees.

Inbound Bearing=225 degrees.

Altitude=15,000 feet.

Wind Blowing From=325 degrees.

Wind Blowing Toward=145 degrees.

Wind Speed=65 knots.

Figure 10:
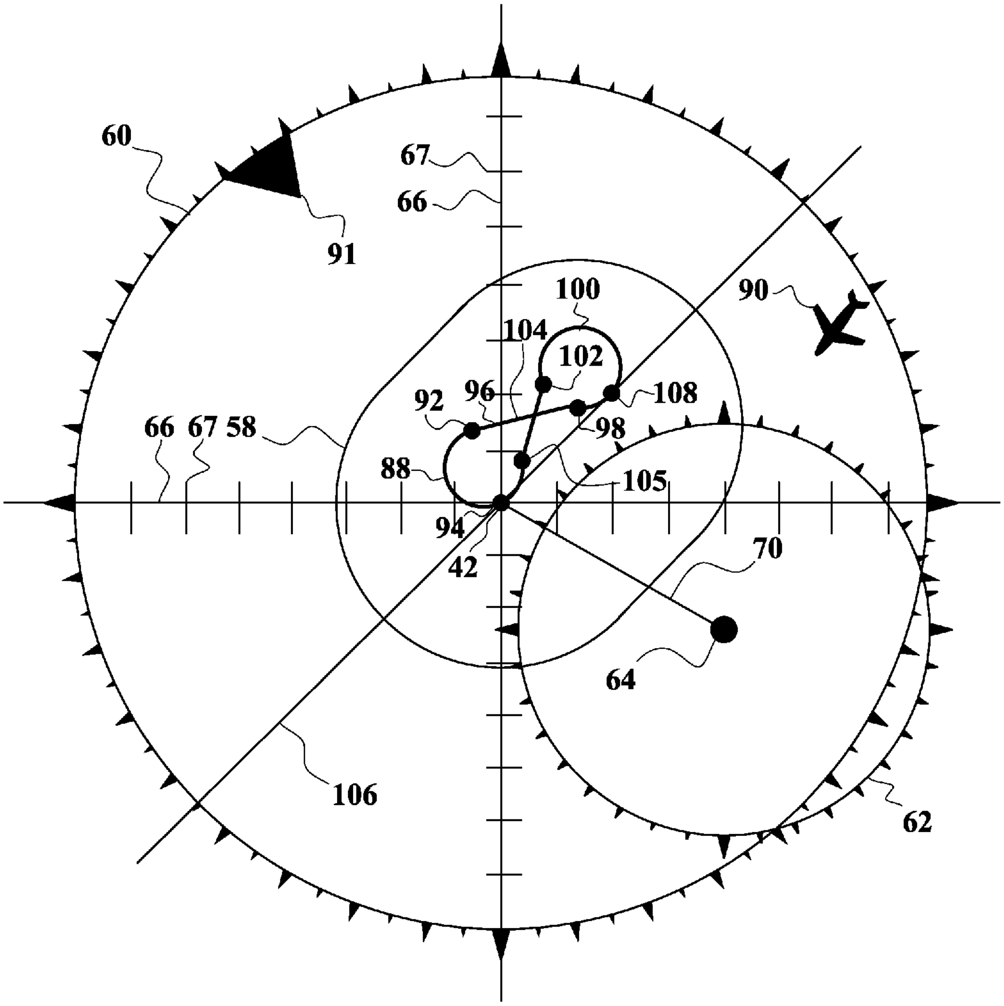
FIG. 10 is a graphical representation of a first figure eight holding pattern generated using the invention.

PATTERN 1 (88 shown in FIG. 10—initial right turn when wind is from the right):

Indicated Inbound Air Speed=186 knots.

Altitude-Corrected Inbound Air Speed=241 knots.

Inbound ground speed=244 knots.

WIND CORRECTED INBOUND BEARING=240 degrees (as indicated by icon 90.)

Enter the holding pattern at FIX 42, and turn "RIGHT" until bearing is 60.0 degrees (at post 92, the end of the outbound turn 94 and the beginning of the outbound leg 96).

Level and fly that bearing until the bearing back to NAVAID is 144.8 degrees (at post 98, the end of the outbound leg and the beginning of the inbound turn 100).

(At post 98) Turn "LEFT", (passing through tangent point 108,) until bearing is 200.0 degrees (at post 102, the beginning of the inbound leg 104).

(Level and fly that bearing until the) Bearing back to NAVAID is 127.5 degrees (at post 105, the end of the inbound leg and the beginning of the outbound turn 94).

(Begin "RIGHT" turn (on outbound turn 94) and repeat circuit.)

(Note that the outbound turn begins before the FIX.)

Start of Inbound leg to NAVAID Slant DME=12.21 NM.

LATITUDE OF START OF INBOUND LEG=N 31 degrees, 48.57 minutes.

LONGITUDE OF START OF INBOUND LEG=W 97 degrees, 11.90 minutes.

(Area enclosed in oval 58 is a) Subset of FAA Basic Template 15.

Inbound leg=6.10 NM, Template 15 LM=9.60 NM, LI=7.70 NM.

(Line 106 indicates the inbound bearing, and passes through the FIX 42 and a tangent point 108 on the inbound turn 100.)

Figure 11:
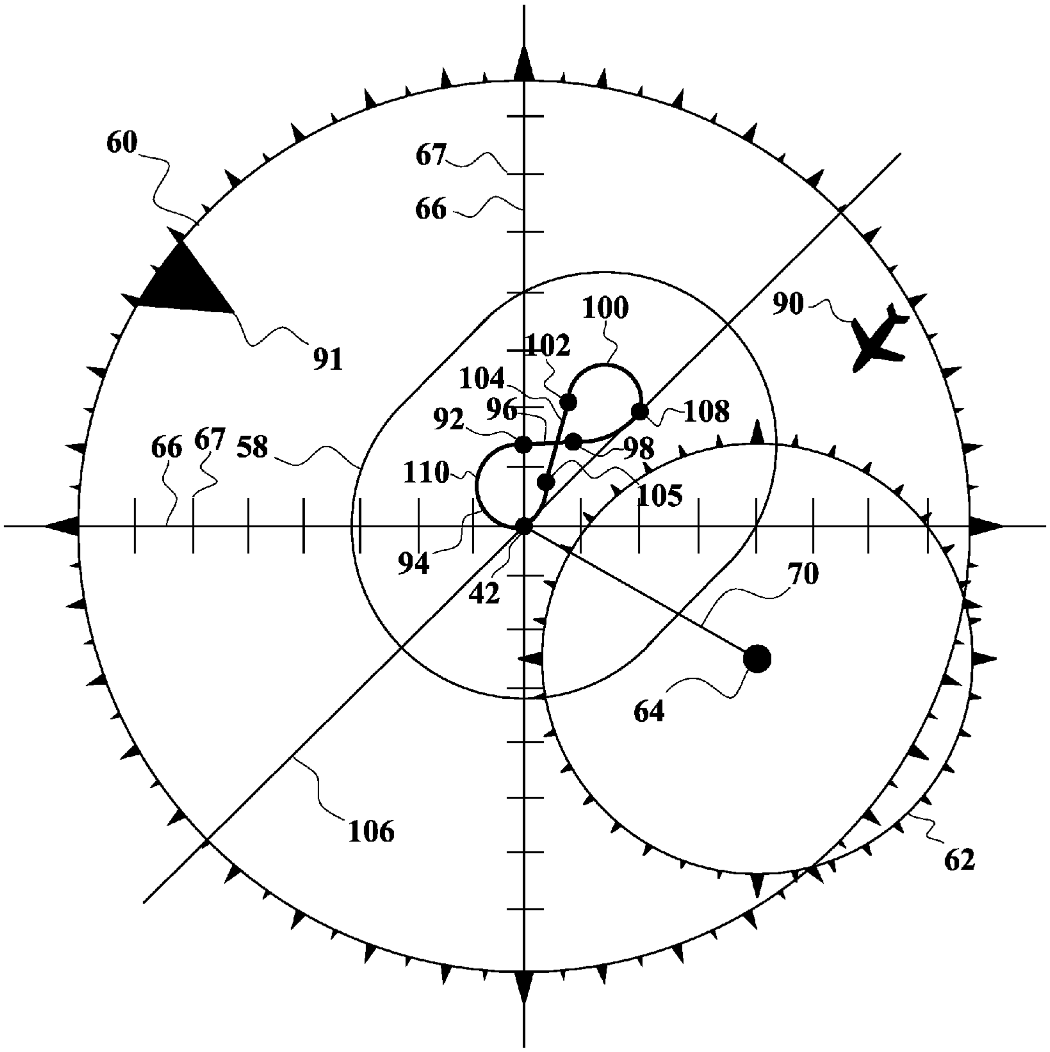
FIG. 11 is a graphical representation of a second figure eight holding pattern generated using the invention.

PATTERN 2 (110 shown in FIG. 11—initial right turn when wind is from the right):

Input direction wind is blowing FROM, in degrees. 305;

(Indicated by triangle 91.)

Wind Blowing From=305 degrees.

Wind Blowing Toward=125 degrees.

Wind Speed=65 knots.

Indicated Inbound, Air Speed=186 knots.

Altitude-Corrected Inbound Air Speed=241 knots.

Inbound ground speed=221 knots.

WIND CORRECTED INBOUND BEARING=240 degrees.

Enter the holding pattern at FIX 42, and turn "RIGHT" until bearing is 78.0 degrees (at post 92, the end of the outbound turn 94 and the beginning of the outbound leg 96).

(Level and fly that bearing until the) Bearing back to NAVAID is 137.8 degrees (at post 98, the end of the outbound leg and the beginning of the inbound turn 100).

(At post 98) Turn "LEFT", (passing through tangent point 108,) until bearing is 205.0 degrees (at post 102, the beginning of the inbound leg 104).

(Level and fly that bearing until the) Bearing back to NAVAID is 126.0 degrees (at post 105, the end of the inbound leg and the beginning of the outbound turn 94).

Begin "RIGHT" turn (on outbound turn 94) and repeat circuit.

Start of Inbound leg to NAVAID Slant DME=12.08 NM.

LATITUDE OF START OF INBOUND LEG=N 31 degrees, 48.16 minutes.

LONGITUDE OF START OF INBOUND LEG=W 97 degrees, 12.37 minutes.

(Area enclosed in oval 58 is a) Subset of FAA Basic Template 15.

Inbound leg=5.52 NM, Template 15 LM=9.60 NM, LI=7.70 NM.

Figure 12:
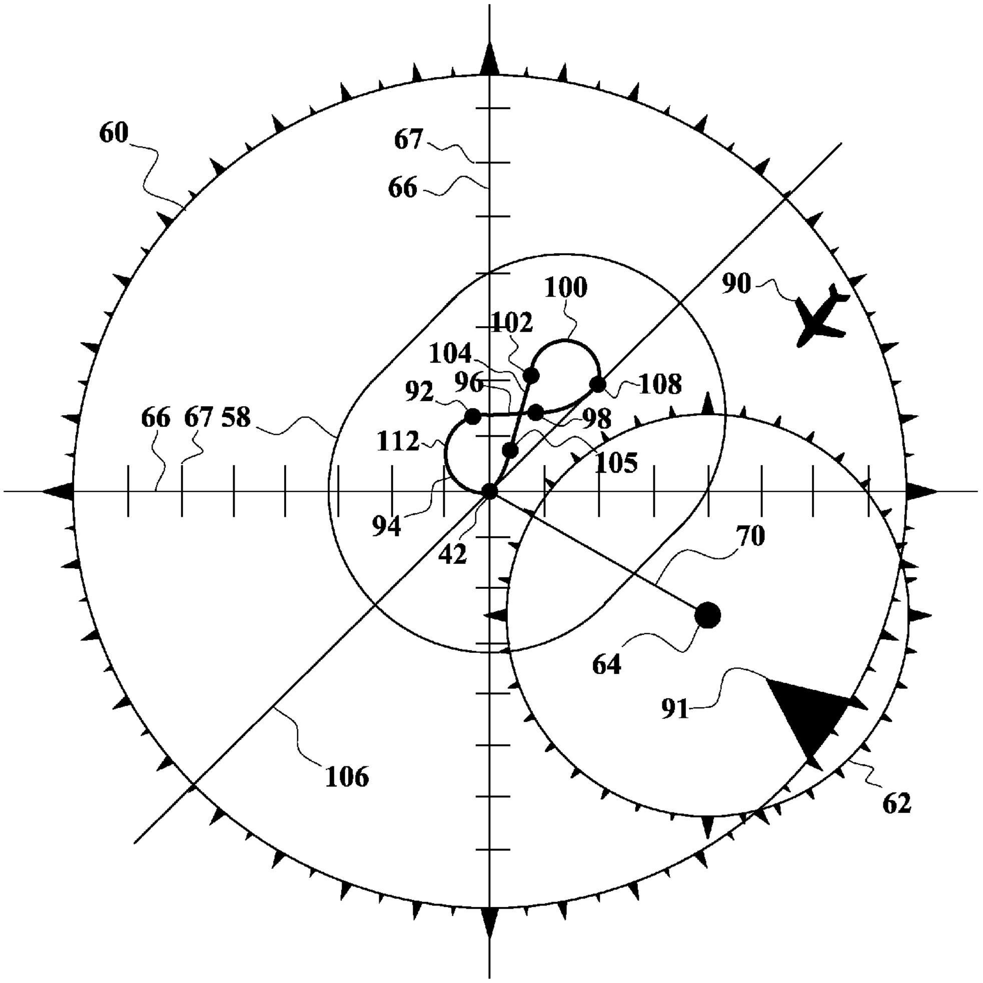
FIG. 12 is a graphical representation of a third figure eight holding pattern generated using the invention.

PATTERN 3 (shown as 112 in FIG. 12—initial right turn when wind is from the left):

Input direction wind is blowing FROM, in degrees. 125;

(Indicated by triangle 91.)

Xproduct=−0.98

Wind Blowing From=125 degrees.

Wind Blowing Toward=305 degrees.

Indicated Inbound Air Speed=186 knots.

Altitude-Corrected Inbound Air Speed=241 knots.

Inbound ground speed=244 knots.

WIND CORRECTED INBOUND BEARING=210 degrees.

Enter the holding pattern at tangent point 108 (on inbound turn 100) and turn RIGHT until bearing is 250.0 degrees (at post 98, the end of the inbound turn and the beginning of the inbound leg 96).

Level and fly that bearing until the bearing back to NAVAID is 129.6 degrees (at post 92, the end of the inbound leg and the beginning of the outbound turn 94).

Figure 13:
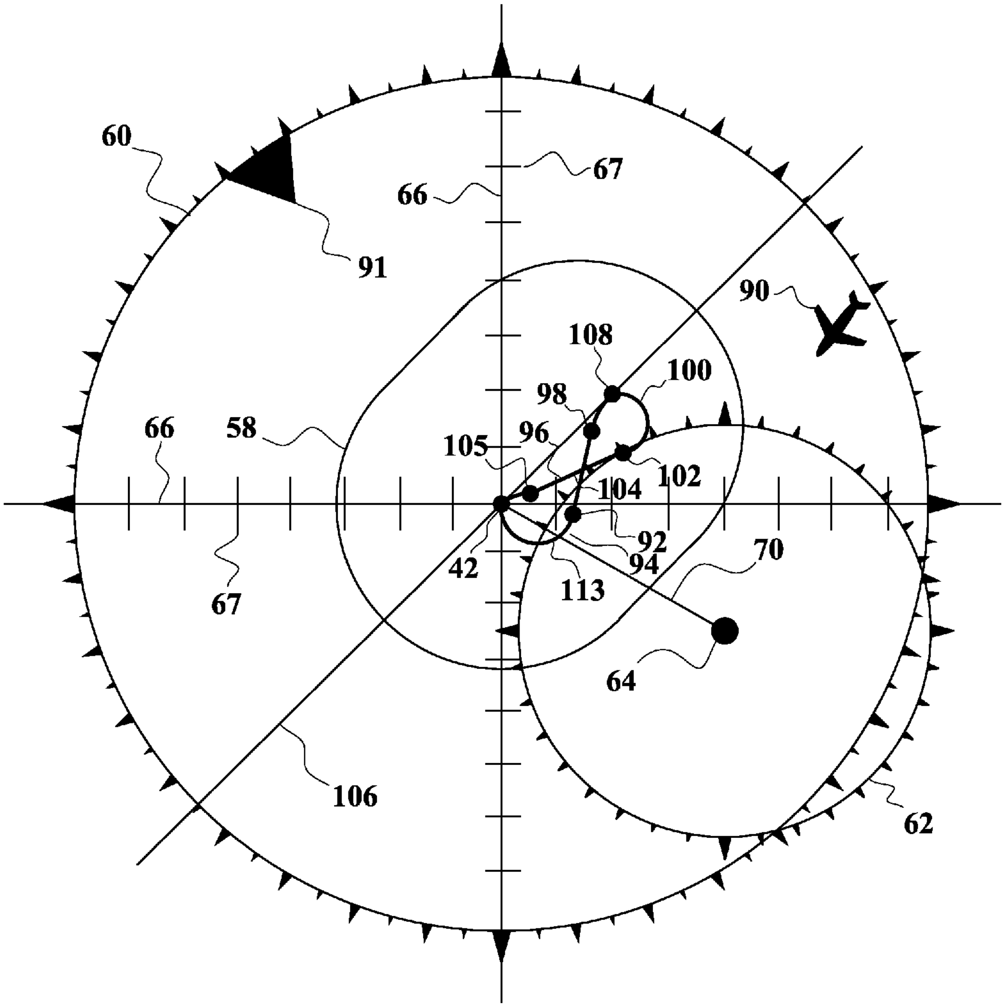
FIG. 13 is a graphical representation of a fourth figure eight holding pattern generated using the invention.
Figure 14:
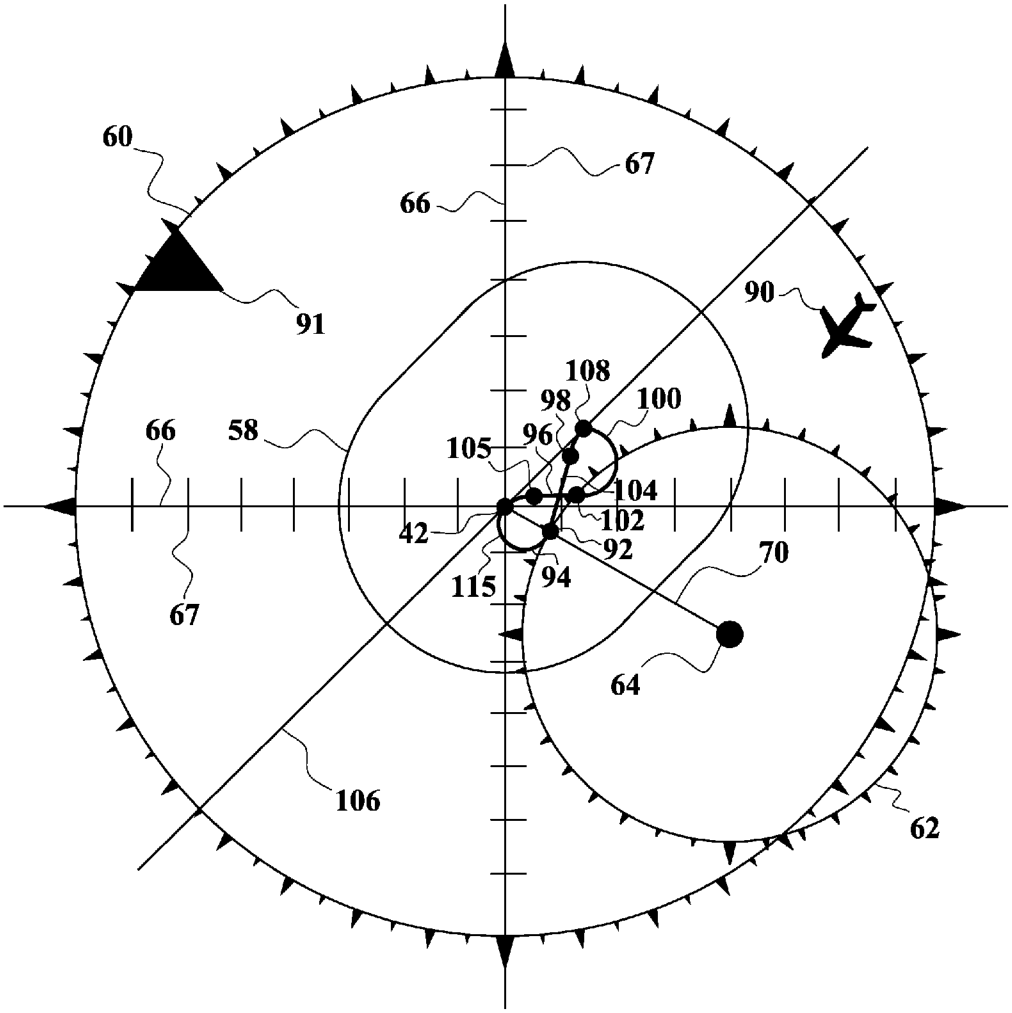
FIG. 14 is a graphical representation of a fifth figure eight holding pattern generated using the invention.
Figure 15:
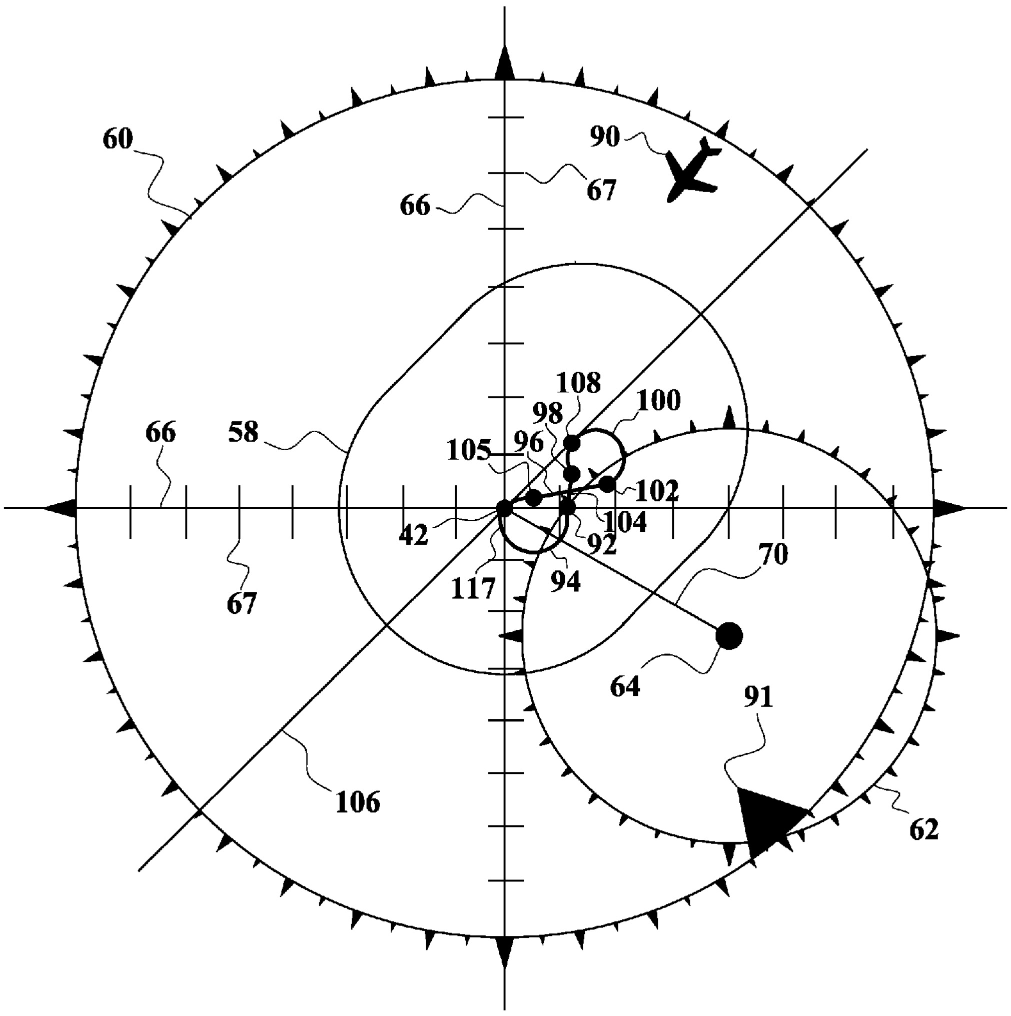
FIG. 15 is a graphical representation of a sixth figure eight holding pattern generated using the invention.

(At that point) Turn LEFT (passing through the FIX 42) until bearing is 30.0 degrees (at post 105, the end of the outbound turn and the beginning of the outbound leg 104). (Level and fly that bearing (on inbound turn 100) until the) Bearing back to NAVAID is 144.3 degrees (at post 102).
(Begin RIGHT turn (on inbound turn 100) and repeat circuit.)
Start of Inbound leg to NAVAID Slant DME=12.21 NM.
LATITUDE OF START OF INBOUND LEG=N 31 degrees, 48.57 minutes.
LONGITUDE OF START OF INBOUND LEG=W 97 degrees, 11.90 minutes.
(Area enclosed in blue is a) Subset of FAA Basic Template 15.
Inbound leg=6.10 NM, Template 15 LM=9.60 NM, LI=7.70 NM.
PATTERN 4 (113 shown in FIG. 13—initial left turn when wind is from the right):
Indicated Inbound Air Speed=186 knots.
Altitude-Corrected Inbound Air Speed=241 knots.
Inbound ground speed=244 knots.
WIND CORRECTED INBOUND BEARING=240 degrees.
Enter the holding pattern at tangent point 108 (on inbound turn 100) turn LEFT until bearing is 200.0 degrees (at post 98, the end of the inbound turn and the start of the inbound leg 104).
Level and fly that bearing until the bearing back to NAVAID is 126.9 degrees (at post 92, the end of the inbound leg and the start of outbound turn 94).
(At post 92) Turn RIGHT (passing through the FIX 42) until bearing is 60.0 degrees (at post 105, the end of the outbound turn and the start of outbound leg 96).
(Level and fly that bearing until the) Bearing back to NAVAID is 149.5 degrees (at post 102).
(Begin LEFT turn (on inbound turn 100) and repeat circuit.)
Start of Inbound leg to NAVAID Slant DME=12.21 NM.
LATITUDE OF START OF INBOUND LEG=N 31 degrees, 48.57 minutes.
LONGITUDE OF START OF INBOUND LEG=W 97 degrees, 11.90 minutes.
(Area enclosed in oval 58 is a) Subset of FAA Basic Template 15.
Inbound leg=6.10 NM, Template 15 LM=9.60 NM, LI=7.70 NM
PATTERN 5 (115 shown in FIG. 14—initial left turn when wind is from the right):
Input direction wind is blowing FROM, in degrees. 305;
(Indicated by triangle 91.)
Wind Blowing From=305 degrees.
Wind Blowing Toward=125 degrees.
Indicated Inbound Air Speed=186 knots.
Altitude-Corrected Inbound Air Speed=241 knots.
Inbound ground speed=221 knots.
WIND CORRECTED INBOUND BEARING=240 degrees.
(Enter the holding pattern at tangent point 108 on inbound turn 100.) Turn LEFT until bearing is 205.0 degrees (at post 98, the end of the inbound turn and the start of inbound leg 104). (Level and fly that bearing until the) Bearing back to NAVAID is 121.5 degrees (at post 92, the end of the inbound leg and the start of outbound turn 94).
(At that point) Turn RIGHT (passing through the FIX 42) until bearing is 78.0 degrees (at post 105, the end of the outbound turn and the start of the outbound leg 96).
(Level and fly that bearing until the) Bearing back to NAVAID is 136.9 degrees (at post 102).
(Begin) LEFT turn (on inbound turn 100 and repeat circuit).
Start of Inbound leg to NAVAID Slant DME=12.08 NM.
LATITUDE OF START OF INBOUND LEG=N 31 degrees, 48.16 minutes.
LONGITUDE OF START OF INBOUND LEG=W 97 degrees, 12.37 minutes.
(Area enclosed in blue is a) Subset of FAA Basic Template 15.
Inbound leg=5.52 NM, Template 15 LM=9.60 NM, LI=7.70 NM.
PATTERN 6. (117 shown in FIG. 15—initial left turn when wind is from the left):
Input direction wind is blowing FROM, in degrees. 145;
(Indicated by triangle 91.)
Xproduct=−0.98
Wind Blowing From=145 degrees.
Wind Blowing Toward=325 degrees.
Indicated Inbound Air Speed=186 knots.
Altitude-Corrected Inbound Air Speed=241 knots.
Inbound ground speed=221 knots.
WIND CORRECTED INBOUND BEARING=210 degrees.
Enter the holding pattern at FIX 42 (on outbound turn 94) and turn “LEFT” until bearing is 12.0 degrees (at post 92, the end of outbound turn 94 and the start of outbound leg 104).
(Level and fly that bearing until the) Bearing back to NAVAID is 138.5 degrees (at post 98, the end of the outbound leg and the start of inbound turn 100).
(At post 98) “RIGHT” (passing through tangent point 108) until bearing is 245.0 degrees (at post 102, the end of the inbound turn and the start of inbound leg 96).
(Level and fly that bearing until the) Bearing back to NAVAID is 125.3 degrees (at post 105, the end of the inbound leg and the start of outbound turn 94).
(Begin “LEFT” turn (on outbound turn 94) and repeat circuit.)
Start of Inbound leg to NAVAID Slant DME=12.08 NM.
LATITUDE OF START OF INBOUND LEG=N 31 degrees, 48.16 minutes.
LONGITUDE OF START OF INBOUND LEG=W 97 degrees, 12.37 minutes.
(Area enclosed in blue is a) Subset of FAA Basic Template 15.
Inbound leg=5.52 NM, Template 15 LM=9.60 NM, LI=7.70 NM.

FIGS. 16-23 are flowcharts showing how the invention may be implemented using a computer program. They are for illustration only. Other types of computer programs may be used to implement the invention.

Figure 16:
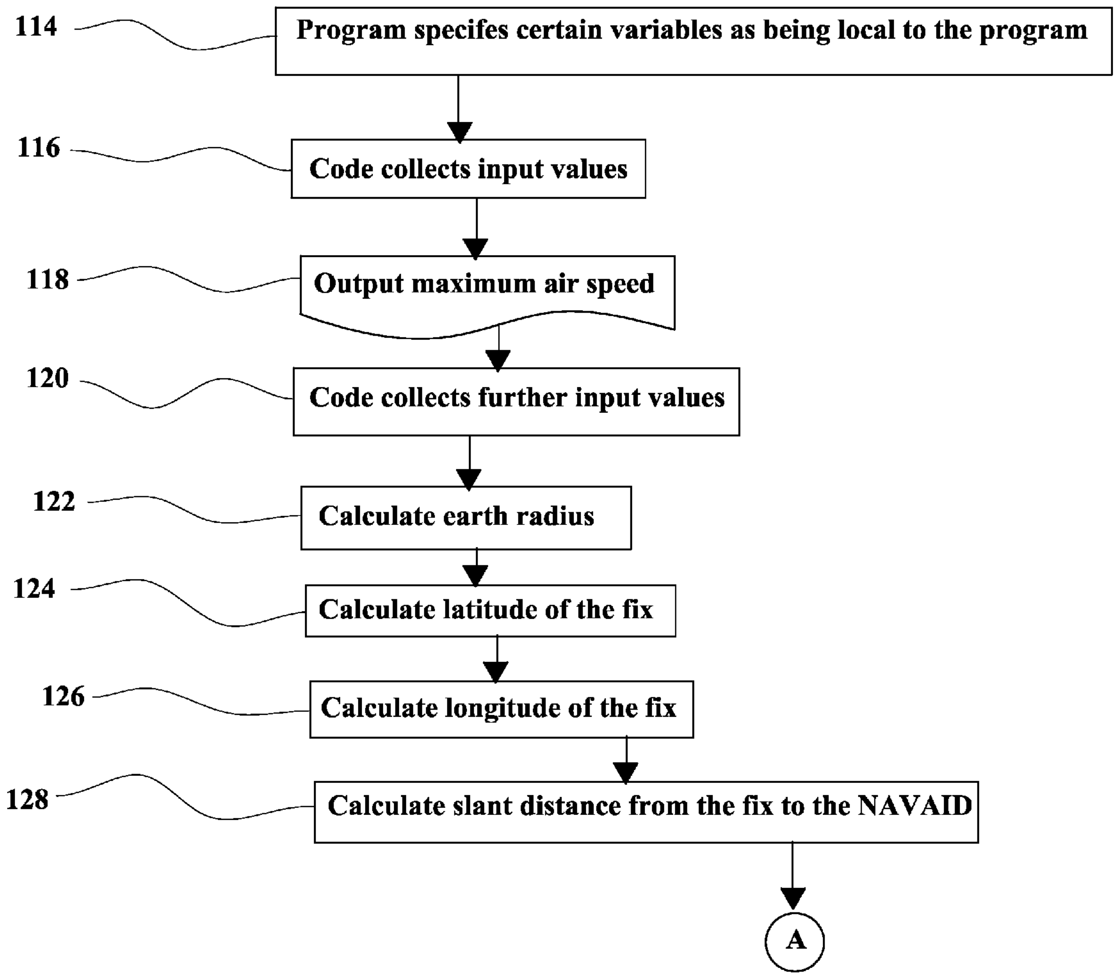
FIG. 16 is a first flow chart showing how the invention may be implemented using a computer program.

In FIG. 16, the program first specifies certain variables as being local to the program 114, such as local coordinates, hold bearing, air speed, altitude, wind speed, etc. The code then collects input values 116, such as NAVAID latitude, longitude, elevation, aircraft type, and maximum speed. Maximum air speed is then printed or otherwise outputted 118. The code again collects input values 120, such as altitude, and NAVAID to FIX distance and bearing. Earth radius is calculated 122. The latitude of the fix is calculated 124. The longitude of the fix is calculated 126. The slant distance from the fix to the NAVAID is then calculated 128.

Figure 17:
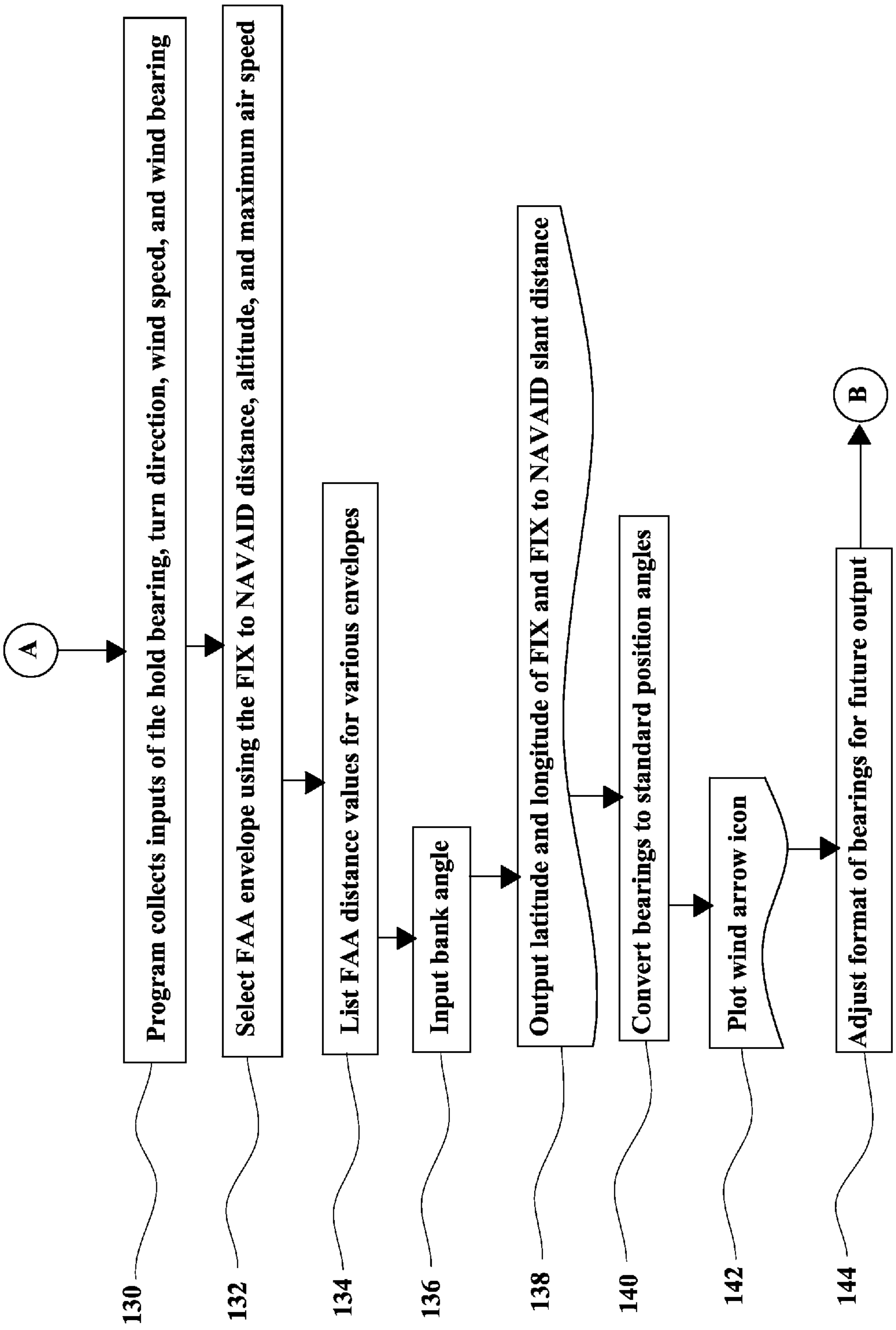
FIG. 17 is a second flow chart showing how the invention may be implemented using a computer program.

In FIG. 17, the program then collects inputs of the hold bearing, turn direction, wind speed, and wind bearing 130. The FAA envelope is selected using the FIX to NAVAID distance, altitude, and maximum air speed 132. FAA distance values for various envelopes are listed 134. The bank angle is inputted 136. The latitude and longitude of the FIX and FIX to NAVAID slant distance are printed or otherwise outputted 138. The bearings may be converted to standard position angles 140. A plot of an icon in the form of an arrow indicating direction is created 142. The format of bearings for future output is adjusted 144.

Figure 18:
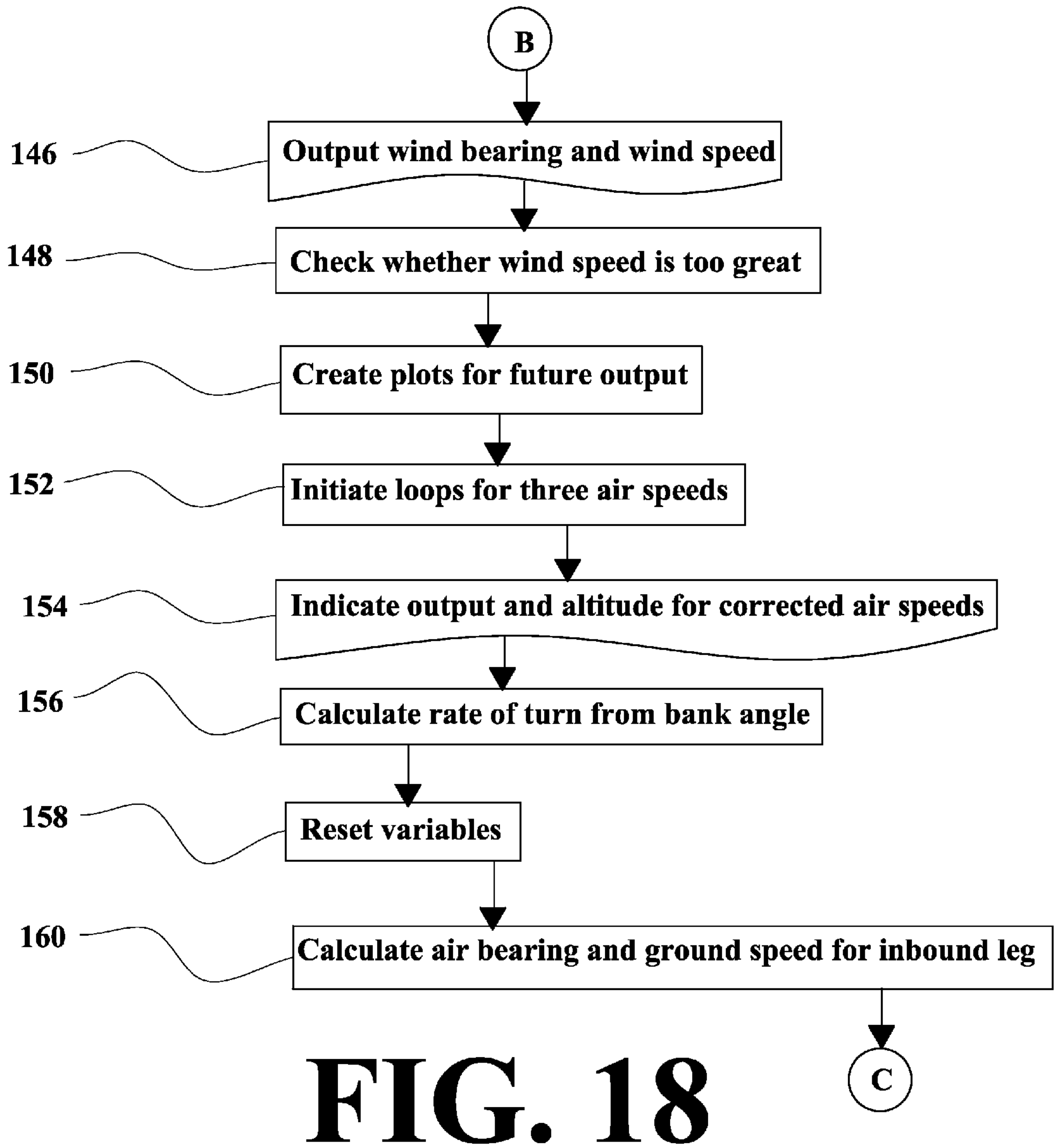
FIG. 18 is a third flow chart showing how the invention may be implemented using a computer program.

In FIG. 18, wind bearing and wind speed are printed or otherwise outputted 146. The program checks to see if wind speed is too great 148. Plots are created for future output 150. Loops for three air speeds are initiated 152. Output and altitude-corrected air speeds are indicated 154. Rate of turn from bank angle is calculated 156. Variables such as degrees per second and wind bearing are reset 158. Calculate the bearing and ground speed for the inbound leg are calculated 160.

Figure 19:
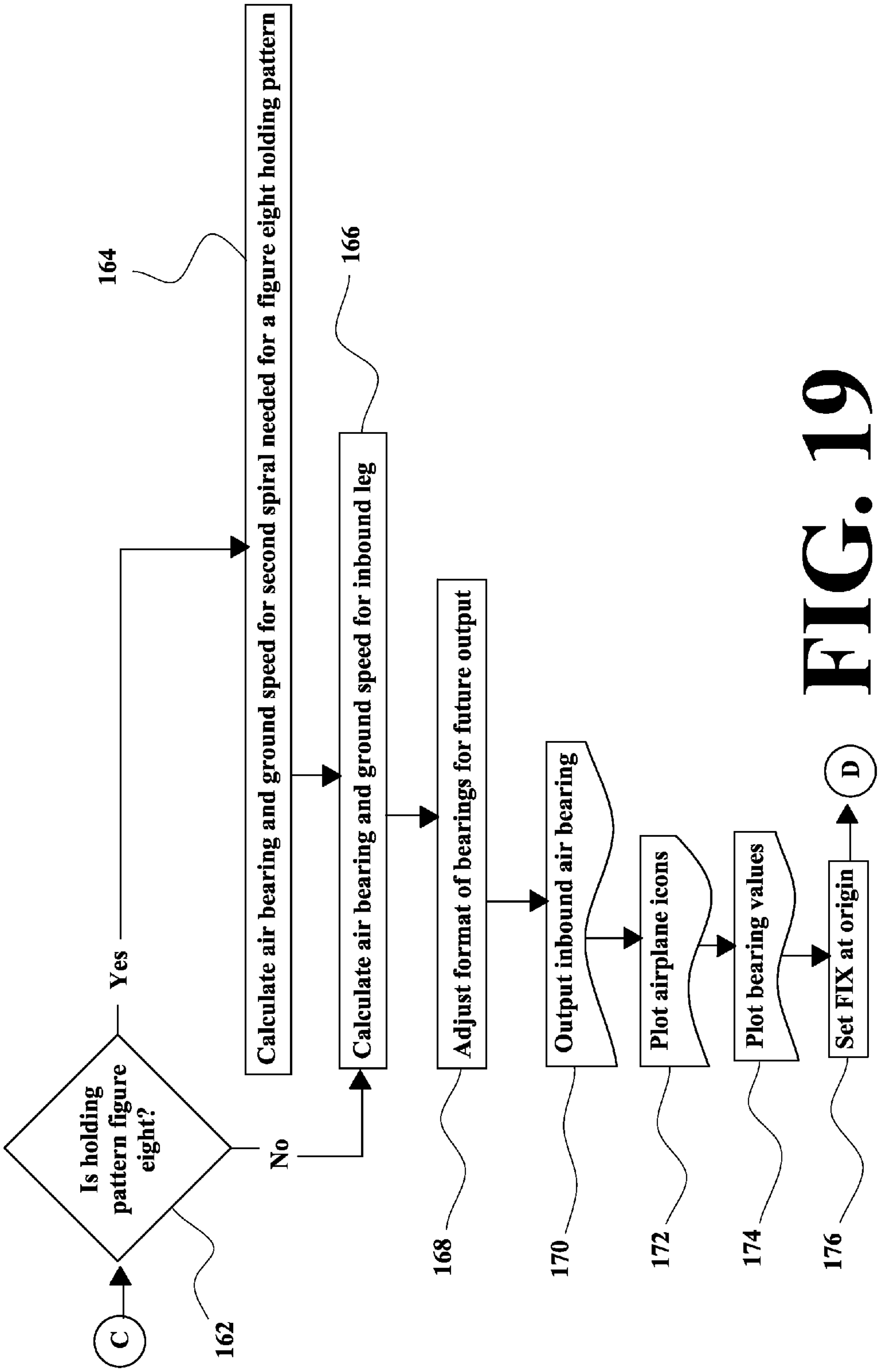
FIG. 19 is a fourth flow chart showing how the invention may be implemented using a computer program.

In FIG. 19, if the holding pattern is a figure eight 162, calculate the bearing and ground speed for the second spiral needed for a figure eight holding pattern 164. Then, regardless of the type of holding pattern, calculate bearing and ground speed for the inbound leg 166. Adjust the format of the bearings for future output 168. Output inbound bearing 170. Create plots to draw airplanes on graph 172. Create text plots to display bearing values on graph 174, and set the FIX at the origin (0, 0) 176.

Figure 20:
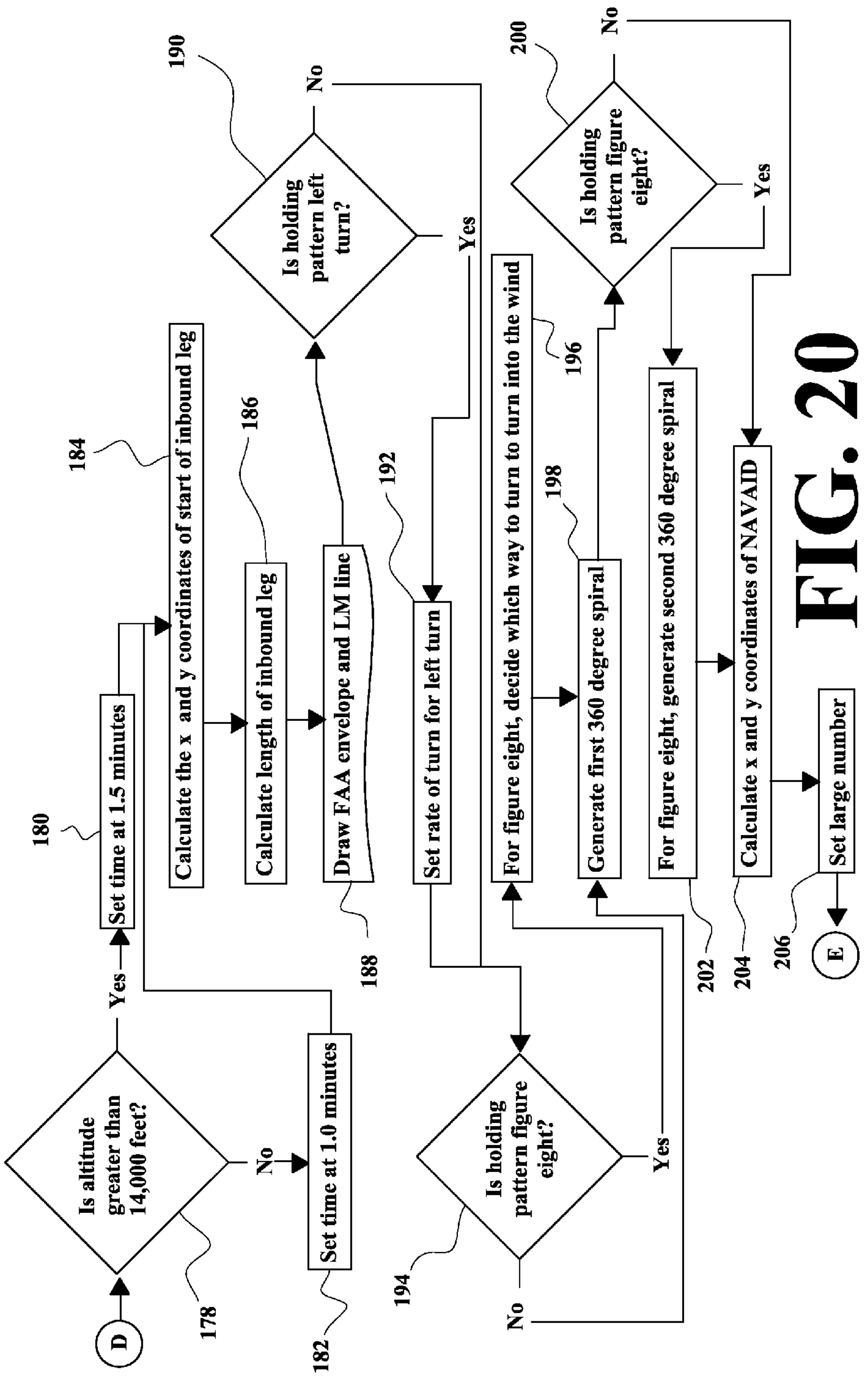
FIG. 20 is a fifth flow chart showing how the invention may be implemented using a computer program.

In FIG. 20, if the altitude is greater than 14,000 feet 178, set the time of the inbound leg to 1.5 minutes 180, else set the time of the inbound leg to 1.0 minutes 182. Calculate the x- and y-coordinates of the start of the inbound leg 184. Calculate the length of the inbound leg 186. The program then draws the FAA envelope and the LM line (68 in FIG. 4-9 or 106 in FIGS. 10-12) 188. If the holding pattern is for a left turn 190, set rate of turn 192. If the holding pattern is a figure eight 194, the computer decides which way to turn to turn into the wind 196. Regardless of the type of holding pattern, next it generates a first 360-degree spiral 198. If and only if the holding pattern is a figure eight 200, it generates a second 360-degree spiral 202. Regardless of the type of holding pattern, it next calculate the x- and y-coordinates of the NAVAID 204. It then sets a large number 206, that is the maximum number of degrees that the wind direction can vary for the holding pattern.

Figure 21:
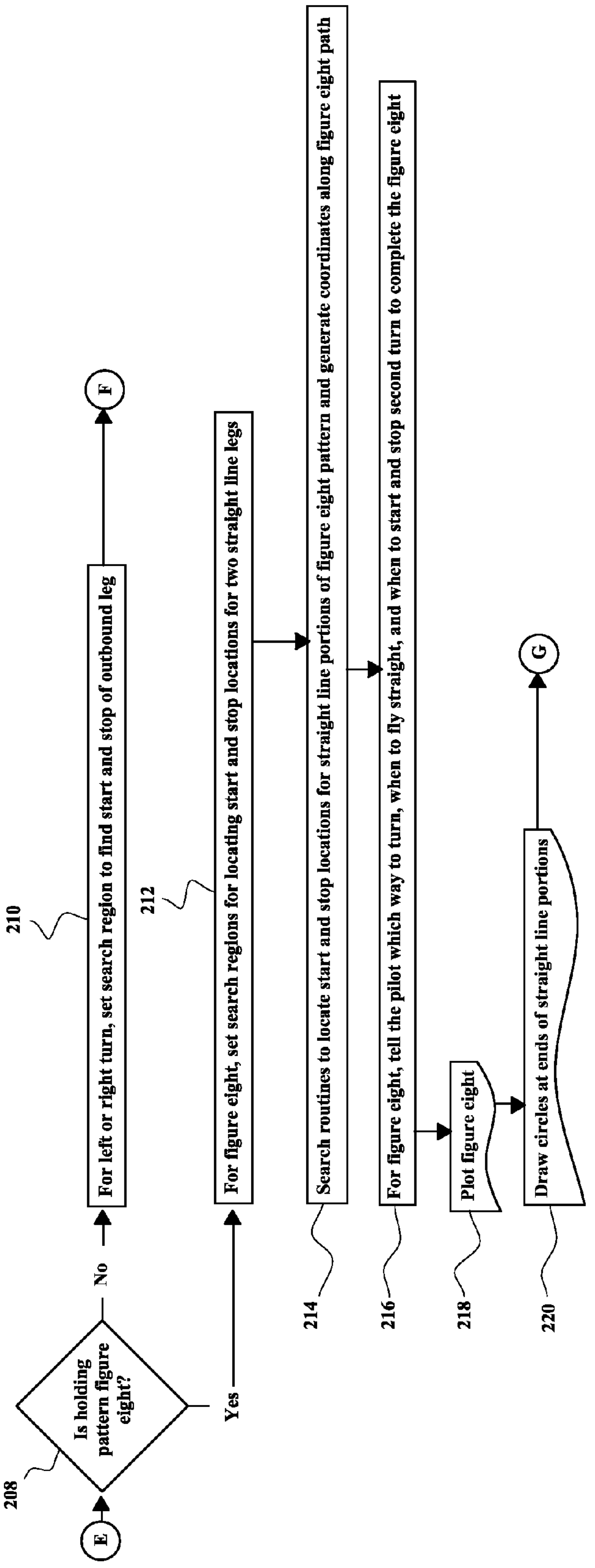
FIG. 21 is a sixth flow chart showing how the invention may be implemented using a computer program.
Figure 22:
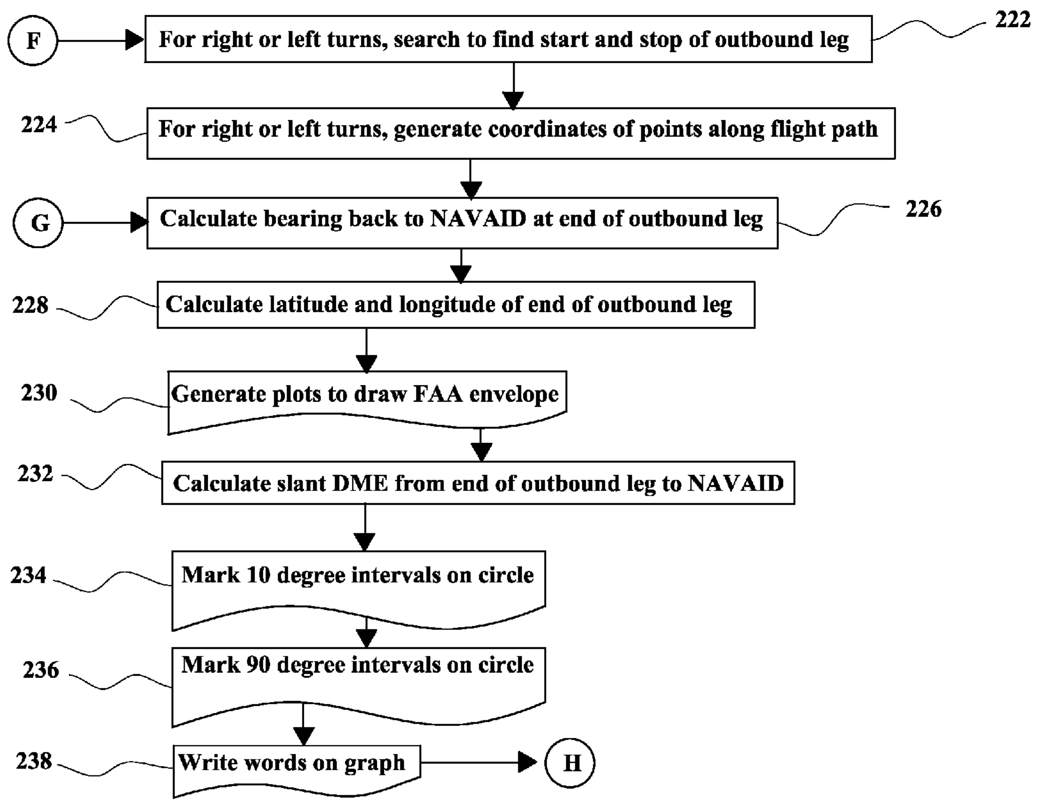
FIG. 22 is a seventh flow chart showing how the invention may be implemented using a computer program.

In FIG. 21, if the holding pattern is not a figure eight 208 (i.e., is a left or right turn), set the search region to find start and stop of the outbound leg 210, and proceed to F in FIG. 22. If the holding pattern is a figure eight, set search regions for locating start and stop locations for two straight line legs 212, perform search routines to locate start and stop locations for straight line portions of figure eight pattern and generate coordinates along the figure eight path 214, tell the pilot which way to turn, when to fly straight, and when to start and stop second turn to complete the figure eight 216, plot the figure eight 218, draw circles at the ends of the straight line portions 220, and proceed to G in FIG. 22.

In FIG. 22, for right or left turns, the program searches to find the start and stop of the outbound leg 222, and generate the coordinates of points along the flight path 224. For any kind of holding pattern, the program then calculates the bearing back to the NAVAID at end of outbound leg 226. Then it calculates the latitude and longitude of the end of the outbound leg 228. It generates the plots to draw the FAA envelope 230. It calculates the slant DME from the end of the outbound leg to the NAVAID 232. It generates plots, marking 10-degree intervals 234 on a circle, and marking 90-degree intervals 236 (with larger marks) on the circle. (It may modify the format of bearings for output.) Then, it writes words on a graph or other display 238.

Figure 23:
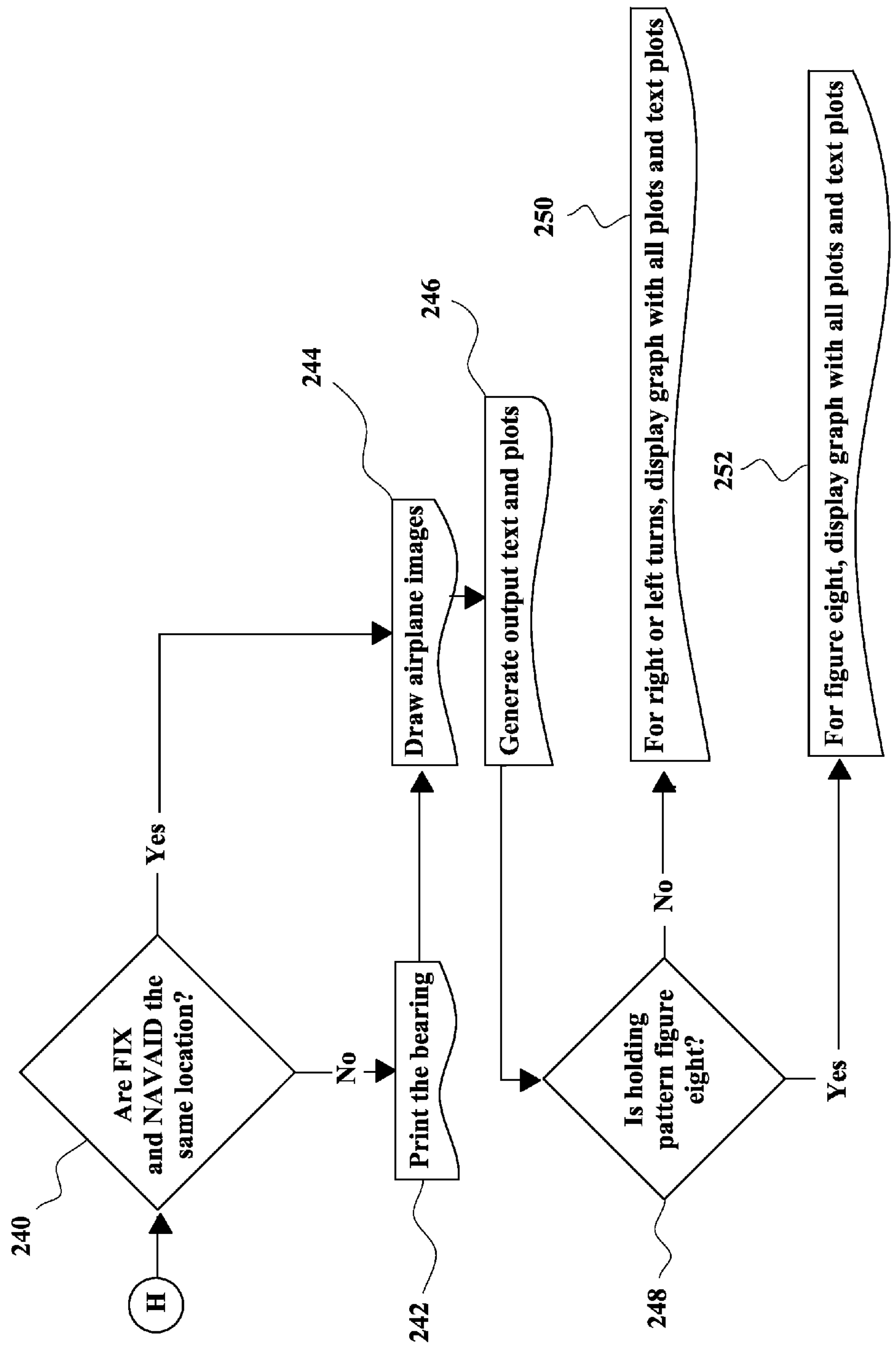
FIG. 23 is an eighth flow chart showing how the invention may be implemented using a computer program.

In FIG. 23, if FIX and NAVAID are not the same location 240, print the bearing 242. In either case, draw airplane images 244, and generate output text and plots 246. If the holding pattern is not a figure eight 248, display the graph with all plots and text plots 250 for a left or right hand holding pattern. If the holding pattern is a figure eight, display the graph with all plots and text plots 252 for a figure eight holding pattern.

It is to be understood that the present invention is not limited to the embodiments described above, but encompasses any and all embodiments within the scope of the following claims.

We claim:

1. A method of calculating a Federal Aviation Administration (FAA) published or FAA Air Traffic Control assigned aeronautical holding pattern, comprising the steps of:

(a) determining wind speed and direction;

(b) choosing a direction of a holding pattern from the group comprising left-hand and right-hand;

(c) selecting a start point and an end point of an inbound leg of the holding pattern;

(d) generating, with an electronic processor and by solving differential equations, a spiral path of an aircraft given the wind speed and direction determined in step (a) making a turn in the direction chosen in step (b);

(e) copying and translating the spiral path, with the electronic processor, so that for a first copy its starting point is the end point of the inbound leg selected in step (c), and for a second copy its ending point is the start point of the inbound leg selected in step (c);

(f) running a search routine, with the electronic processor, to locate positions on the first and second copy of the spiral path that have, as close as possible, the same bearing;

(g) making the positions located in step (f) the start and end points of an outbound leg of the holding pattern; and (h) flying an aircraft in the holding pattern;

wherein, "spiral path" is defined as a curved path with a continuously increasing radius of curvature.

2. The method of calculating an aeronautical holding pattern according to claim 1, comprising the further steps of:

(i) notifying a pilot, using the electronic processor, of a maximum allowed holding pattern airspeed for an aircraft;

(j) inputting a bank angle selected by the pilot into the electronic processor;

(k) generating and displaying, using the electronic processor, holding patterns for the maximum allowed airspeed and at least two lesser airspeeds;

(l) displaying boundaries of a protected airspace within which the aircraft must fly with the holding patterns of step (k), enabling the pilot to see if the holding patterns are within the protected airspace; and (m) if none of the holding patterns of step (k) are within the protected airspace, enabling the pilot to input a greater bank angle into the electronic processor, and generating and displaying new holding patterns using the electronic processor.

3. The method of calculating an aeronautical holding pattern according to claim 2, comprising the further step of:

using global positioning data to display the position of the aircraft in the display of the holding patterns and boundaries of the protected airspace.

4. The method of calculating an aeronautical holding pattern according to claim 1, wherein:

the spiral path generated in step (d) is constructed from solutions of the following differential equations, where the fix is the ending point of the inbound leg, and is set at the origin (0, 0), and the x- and y-positions of the aircraft at time t (in seconds) are:

$$x=as\{\sin[abo+(dps)t]/dps\}+ws[\cos(wb)]t$$

$$y=-as\{\cos[abo+(dps)t)]/dps\}+ws[\sin(wb)]t$$

wherein:

dps=rate of change in the air bearing in radians per second;

as=air speed in meters per second;

ws=wind speed in meters per second;

wb=standard position angle representation of the wind bearing in radians; and abo=inbound air bearing in radians represented as an angle in standard position.

5. The method of calculating an aeronautical holding pattern according to claim 1, wherein when there is no wind, the spiral path becomes circular.

6. The method of calculating an aeronautical holding pattern according to claim 1, wherein the electronic processor is in a stand alone device.

7. The method of calculating an aeronautical holding pattern according to claim 1, wherein the electronic processor is integrated into a system of an aircraft.

8. A method of calculating a Federal Aviation Administration (FAA) published or FAA Air Traffic Control assigned aeronautical holding pattern, comprising the steps of:

(a) determining wind speed and direction;

(b) choosing a direction of a holding pattern from the group comprising left-hand and right-hand;

(c) selecting a start point and an end point of an inbound leg of the holding pattern;

(d) generating, with an electronic processor and by repeated triangulation, a spiral path of an aircraft given the wind speed and direction determined in step (a) making a turn in the direction chosen in step (b);

(e) copying and translating the spiral path, with the electronic processor, so that for a first copy its starting point is the end point of the inbound leg selected in step (c), and for a second copy its ending point is the start point of the inbound leg selected in step (c);

(f) running a search routine, with the electronic processor, to locate positions on the first and second copy of the spiral path that have, as close as possible, the same bearing;

(g) making the positions located in step (f) the start and end points of an outbound leg of the holding pattern; and (h) flying an aircraft in the holding pattern;

wherein, "spiral path" is defined as a curved path with a continuously increasing radius of curvature.

9. The method of calculating an aeronautical holding pattern according to claim 8, comprising the further steps of:

(i) notifying a pilot, using the electronic processor, of a maximum allowed holding pattern airspeed for an aircraft;

(j) inputting a bank angle selected by the pilot into the electronic processor;

(k) generating and displaying, using the electronic processor, holding patterns for the maximum allowed airspeed and at least two lesser airspeeds;

(l) displaying boundaries of a protected airspace within which the aircraft must fly with the holding patterns of step (k), enabling the pilot to see if the holding patterns are within the protected airspace; and (m) if none of the holding patterns of step (k) are within the protected airspace, enabling the pilot to input a greater bank angle into the electronic processor, and generating and displaying new holding patterns using the electronic processor.

10. The method of calculating an aeronautical holding pattern according to claim 9, comprising the further step of:

using global positioning data to display the position of the aircraft in the display of the holding patterns and boundaries of the protected airspace.

11. The method of calculating an aeronautical holding pattern according to claim 8, wherein when there is no wind, the spiral path becomes circular.

12. The method of calculating an aeronautical holding pattern according to claim 8, wherein the electronic processor is in a stand alone device.

13. The method of calculating an aeronautical holding pattern according to claim 8, wherein the electronic processor is integrated into a system of an aircraft.

14. A method of calculating a figure eight aeronautical holding pattern, in a location and at an altitude as published by the FAA or as assigned by FAA Air Traffic Control, comprising the steps of:

(a) determining wind speed and direction;

(b) selecting a start point and an end point of an inbound leg of the holding pattern;

(c) generating, with an electronic processor and by using methods selected from the group comprising solving differential equations and repeated triangulation, a first spiral path of an aircraft given the wind speed and direction determined in step (a) and making a turn into the wind;

(d) copying and translating the first spiral path, with the electronic processor, so that for a first copy its starting point is the end point of the inbound leg selected in step (b), and for a second copy its ending point is the end point of the inbound leg selected in step (b);

(e) generating, with an electronic processor and by using methods selected from the group comprising solving differential equations and repeated triangulation, a second spiral path of an aircraft given the wind speed and direction determined in step (a) and making a turn in the opposite direction from the turn in step (c);

(f) copying and translating the second spiral path, with the electronic processor, so that for a third copy its starting point is the start point of the inbound leg selected in step (b), and for a fourth copy its ending point is the start point of the inbound leg selected in step (b);

(g) running a search routine, with the electronic processor, to locate positions on the first and fourth copies that have, as close as possible, the same bearing;

(h) making the positions located in step (g) the start and end points of a first straight line portion of the figure eight holding pattern;

(i) running a search routine, with the electronic processor, to locate positions on the second and third copies that have, as close as possible, the same bearing;

(j) making the positions located in step (i) the start and end points of a second straight line portion of the figure eight holding pattern; and (k) flying an aircraft in the holding pattern;

wherein, "spiral path" is defined as a curved path with a continuously increasing radius of curvature.

15. The method of calculating a figure eight aeronautical holding pattern according to claim 14, comprising the further steps of:

(l) notifying a pilot, using the electronic processor, of a maximum allowed holding pattern airspeed for an aircraft;

(m) inputting a bank angle selected by the pilot into the electronic processor;

(n) generating and displaying, using the electronic processor, holding patterns for the maximum allowed airspeed and at least two lesser airspeeds;

(o) displaying boundaries of a protected airspace within which the aircraft must fly with the holding patterns of step (n), enabling the pilot to see if the holding patterns are within the protected airspace; and (p) if none of the holding patterns of step (n) are within the protected airspace, enabling the pilot to input a greater bank angle into the electronic processor, and generating and displaying new holding patterns using the electronic processor.

16. The method of calculating a figure eight aeronautical holding pattern according to claim 14, comprising the further step of:

using global positioning data to display the position of the aircraft in the display of the holding patterns and boundaries of the protected airspace.

17. The method of calculating a figure eight aeronautical holding pattern according to claim 14, wherein:

the first and second spiral paths are constructed from solutions of the following differential equations, where the fix is the ending point of the inbound leg, and is set at the origin (0, 0), and the x- and y-positions of the aircraft at time t (in seconds) are:

$$x=\{[as\sin(abo+(dps)t)]/dps\}+ws\cos(wb)t$$

$$y=-\{[as\cos(abo+(dps)t)]/dps\}+ws\sin(wb)t$$

wherein:

dps=rate of change in the air bearing in radians per second;

as=air speed in meters per second;

ws=wind speed in meters per second;

wb=standard position angle representation of the wind bearing in radians; and abo=inbound air bearing in radians represented as an angle in standard position.

18. The method of calculating a figure eight aeronautical holding pattern according to claim 14, wherein when there is no wind, the spiral paths become circular.

19. The method of calculating a figure eight aeronautical holding pattern according to claim 14, wherein the electronic processor is in a stand alone device.

20. The method of calculating a figure eight aeronautical holding pattern according to claim 14, wherein the electronic processor is integrated into a system of an aircraft.

* * * * *